US012612993B2

(12) United States Patent
Maichel

(10) Patent No.: US 12,612,993 B2
(45) Date of Patent: Apr. 28, 2026

(54) GATE INSERT VALVE AND METHOD OF INSERTION INTO PRESSURIZED PIPELINES

(71) Applicant: Jeffrey Maichel, Murrieta, CA (US)

(72) Inventor: Jeffrey Maichel, Murrieta, CA (US)

( * ) Notice: Subject to any disclaimer, the term of this patent is extended or adjusted under 35 U.S.C. 154(b) by 22 days.

(21) Appl. No.: 18/877,123

(22) PCT Filed: Jun. 27, 2023

(86) PCT No.: PCT/US2023/026381
§ 371 (c)(1),
(2) Date: Dec. 19, 2024

(87) PCT Pub. No.: WO2024/006306
PCT Pub. Date: Jan. 4, 2024

(65) Prior Publication Data
US 2025/0377063 A1     Dec. 11, 2025

Related U.S. Application Data

(60) Provisional application No. 63/355,899, filed on Jun. 27, 2022.

(51) Int. Cl.
*F16L 55/16*          (2006.01)
*F16K 3/02*          (2006.01)
(52) U.S. Cl.
CPC ............ *F16L 55/1608* (2013.01); *F16K 3/02* (2013.01)
(58) Field of Classification Search
CPC ... F16L 55/1608; F16L 55/105; F16L 41/002; F16L 41/04; F16L 41/06
See application file for complete search history.

(56) References Cited

U.S. PATENT DOCUMENTS 4,527,586 A * 7/1985 Yano ..................... F16L 55/105
                                             29/890.11
6,776,184 B1 8/2004 Maichel et al.
                    (Continued)

FOREIGN PATENT DOCUMENTS

WO      2021/163710        8/2021

OTHER PUBLICATIONS

International Search Report and Written Opinion for corresponding International Patent Application No. PCT/US2023/026381, dated Sep. 20, 2023.

(Continued)

*Primary Examiner* — Reinaldo Sanchez-Medina
(74) *Attorney, Agent, or Firm* — LOZA & LOZA, LLP; Michael F. Fedrick

(57)          ABSTRACT

A method of cutting and removing a section of pipe, such as prestressed concrete cylinder pipe, and installing a replacement gate valve while the pipeline is fully pressurized by use of a replacement valve body. The replacement valve body includes two cylinders that match the openings of the cut pipe, and inside each of the two cylinders is a cut-covering assembly which includes a cylindrical elastomeric seal and a spring tube. The replacement valve body further includes a linear moving gate in a central portion of the valve, and when the cylinder ends of the replacement valve body are positioned adjacent the bores of cut pipe ends, the gate can be moved to push the elastomeric seals of each of the cut-covering assemblies into the bores of the cut pipe ends, thereby covering gaps created when the pipe was cut and placing the pipe ends in fluid-tight engagement with the replacement valve body.

14 Claims, 35 Drawing Sheets

(56)     References Cited

U.S. PATENT DOCUMENTS

| | | | | |
|---|---|---|---|---|
| 10,612,672 | B2 * | 4/2020 | Maichel | ................. F16K 3/0263 |
| 11,892,115 | B2 * | 2/2024 | Maichel | .................. F16K 43/00 |
| 11,959,577 | B2 * | 4/2024 | Maichel | .................. F16L 55/18 |
| 2002/0148503 | A1 * | 10/2002 | Sato | ...................... F16L 55/105 |
| | | | | 137/318 |
| 2009/0224197 | A1 * | 9/2009 | Nakano | ................... F16K 3/314 |
| | | | | 251/326 |
| 2013/0068985 | A1 | 3/2013 | Maichel | |
| 2016/0305593 | A1 * | 10/2016 | Kearns | .................. F16K 27/062 |
| 2018/0119823 | A1 | 5/2018 | Murphy et al. | |
| 2018/0372231 | A1 | 12/2018 | Maichel | |
| 2025/0146602 | A1 * | 5/2025 | Chung | ................ F16L 55/1608 |

OTHER PUBLICATIONS

International Preliminary Examination Report for corresponding International Patent Application No. PCT/US2023/026381, dated Aug. 19, 2024.

* cited by examiner

Figure 27

GATE INSERT VALVE AND METHOD OF INSERTION INTO PRESSURIZED PIPELINES

CROSS-REFERENCE TO RELATED APPLICATIONS

This application is the U.S. national stage of International Patent Application No. PCT/US2023/026381, filed on Jun. 27, 2023 and entitled GATE INSERT VALVE AND METHOD OF INSERTION INTO PRESSURIZED PIPE-LINES, which claims the benefit of priority under 35 U.S.C. § 119 (e) from U.S. Patent Application No. 63/355,899, filed Jun. 27, 2022. The disclosures of the foregoing applications are incorporated herein by reference in their entireties.

BACKGROUND

In the past pipe insertion valve ends were joined by complex bells and spigots, much larger than the pipe's diameter, to perform joining and these configurations had to slide together mechanically within a pressurized enclosure. On prestressed concrete cylinder pipe (PCCP), only short work areas can be allowed so the thin cylinder can stay restrained. With known external pipeline sealing methods, long areas of the cylinder would have to be stripped of wire, running the risk of a blowout or a cylinder rupture, which has kept inserting of valves from being performed. There remains a need therefore for improved ways of installing valves in PCCP, in particular for systems which don't use a butterfly valve, such as raw sewage systems.

SUMMARY

The present method and replacement valve allow the installation of a gate valve by requiring the temporary enclosure to be installed in only short areas, and once the enclosure is removed outside couplings can be installed in the same location of the procedure. This procedure can be performed on most known pipe types including specialty pipe known as prestressed concrete cylinder pipe.

In particular, the present replacement valve assembly includes:

(1) a valve body having a right side and a left side, the valve body including a right side cylinder, a left side cylinder, and a central chamber between the right side cylinder and the left side cylinder, wherein the central chamber, the right side cylinder, and the left side cylinder are disposed along a longitudinal axis and are in fluid communication so as to form a fluid passage between a right side cylindrical opening of the right side cylinder and a left side cylindrical opening of the left side cylinder, and wherein the central chamber comprises a movable valve, which can be a gate valve;

(2) a right side cut-covering assembly in an interior of the right side cylinder, including:

a right side tube, which is optionally a spring tube, having an exterior surface, an interior surface, a right side, and a left side;

a right side elastomeric seal having an exterior surface and an interior surface, wherein the exterior surface of the right side elastomeric seal contacts an interior surface of the right side cylinder and the interior surface of the right side elastomeric seal contacts the exterior surface of the right side tube; and a right side sloped surface formed in or mechanically connected to the left side of the right side tube, the sloped surface having an angle of less than 90° and extending into the central chamber; and (3) a left side cut-covering assembly in an interior of the left side cylinder, including:

a left side tube, which is optionally a spring tube, having an exterior surface, an interior surface, a right side, and a left side;

a left side elastomeric seal having an exterior surface and an interior surface, wherein the exterior surface of the left side elastomeric seal contacts an interior surface of the left side cylinder and the interior surface of the left side elastomeric seal contacts the exterior surface of the left side tube; and a left side sloped surface formed in or mechanically connected to the right side of the left side tube, the sloped surface having an angle of less than 90° and extending into the central chamber.

When the valve of the valve assembly is moved between a first position and a second position, such as from an upper portion of the valve assembly into a lower portion, a right side of the valve contacts the sloped surface of the right side tube and urges a right side end of the right side cut-covering assembly out of the right side cylindrical opening, and simultaneously a left side of the valve contacts the sloped surface of the left side tube and urges a left side end of the left side cut-covering assembly out of the left side cylindrical opening. This action places the valve assembly into fluid-tight engagement with cut ends of a pipe between which the valve assembly is secured.

In one embodiment, the sloped surfaces are formed by ends of the right and left side tubes. Specifically, the right side sloped surface is formed in the left side of the right side tube and the left side sloped surface is formed in the right side of the left side tube. In another embodiment, the sloped surfaces are mechanically connected to cross bracing secured within the right and left side tubes. In this embodiment, at least a first cross brace extends between a first position on the interior surface of the right side tube and a second position on the interior surface of the right side tube, and the right side sloped surface comprises a flange extending from the first cross brace inwardly toward the central chamber; and at least a second cross brace extends between a first position on the interior surface of the left side tube and a second position on the interior surface of the left side tube, and the left side sloped surface comprises a flange extending from the second cross brace inwardly toward the central chamber. Preferably, the flange of each of the first and second cross braces is a bent or curved bar. In other embodiments, a third cross brace can be added which extends between the interior surface of the right side tube and comprises a flange having a sloped surface which extends from the third cross brace inwardly toward the central chamber, and a fourth cross brace can be added which extends between the interior surface of the left side tube and comprises a flange having a sloped surface which extends from the fourth cross brace inwardly toward the central chamber.

This valve assembly can be used for example in a method for replacing a valve in a pipe. Such a method can include the steps of:

placing a housing in fluid-tight engagement with the pipe on a right side and a left side of the valve;

cutting the pipe on a right side and a left side of the valve, thereby creating a right side opening and a left side opening in the pipe;

removing the valve through the housing;

advancing a replacement valve assembly into the housing, wherein a cut-covering assembly is disposed within each pipe end of the replacement valve assembly, each cut-covering assembly including a cylindrical, elastomeric seal, a tube within the seal, and a sloped surface formed in or mechanically connected to the tube, the sloped surface having an angle of less than 90° and extending inwardly toward a central portion of the valve assembly, the valve assembly further including a linear moving valve for placement between the cut-covering assemblies;

placing the pipe ends of the valve assembly into alignment with the right side opening and the left side opening of the pipe; and moving the valve from a first position to a second position, wherein a right side of the valve thereby contacts the sloped surface of a right side cut-covering assembly and urges a right side end of the right side cut-covering assembly into the right side opening of the pipe, and simultaneously a left side of the valve contacts the sloped surface of the left side cut-covering assembly and urges a left side end of the left side cut-covering assembly into the left side opening of the pipe, thereby placing the valve assembly into fluid-tight engagement with the cut ends of the pipe.

In one embodiment, the sloped surface of the right side cut-covering assembly is formed in the left side of the tube of the right side cut-covering assembly, and the left side sloped surface is formed in the right side of the tube of the left side cut-covering assembly. Alternatively, the sloped surfaces can be in the form of a flange extending from a first cross brace in an interior of the tube of the right side cut-covering assembly, and another flange extending from a second cross brace in an interior of the tube of the left side cut-covering assembly.

The pipe into which a valve is installed according to one embodiment of this method is a prestressed concrete cylinder pipe (PCCP) having a concrete outer layer, an interior metal cylinder, and a wire wound around the metal cylinder. In this embodiment, the method preferably further includes the step of adding centering collars matching the pipe's outside diameter on top of each of the right side opening and the left side opening of the pipe.

The cutting mechanism is shown to be advancing toward the pipeline and can be retracted by means of a feed screw that can be operated by rotating two screw jacks, though a single jackscrew can be used. The cutting tool uses power drive heads that is shown to rotate two belts that have diamonds or other known cutting or abrasive medium attached. Two belts are shown to perform two simultaneous cuts at the same time to achieve separation of a pipe section. On various projects it may be required to make a single cut at a time but two are shown for simplicity. The cutting mechanism feed screw can also be used to operate the new valve's isolator to an open or closing position.

Figure 7:
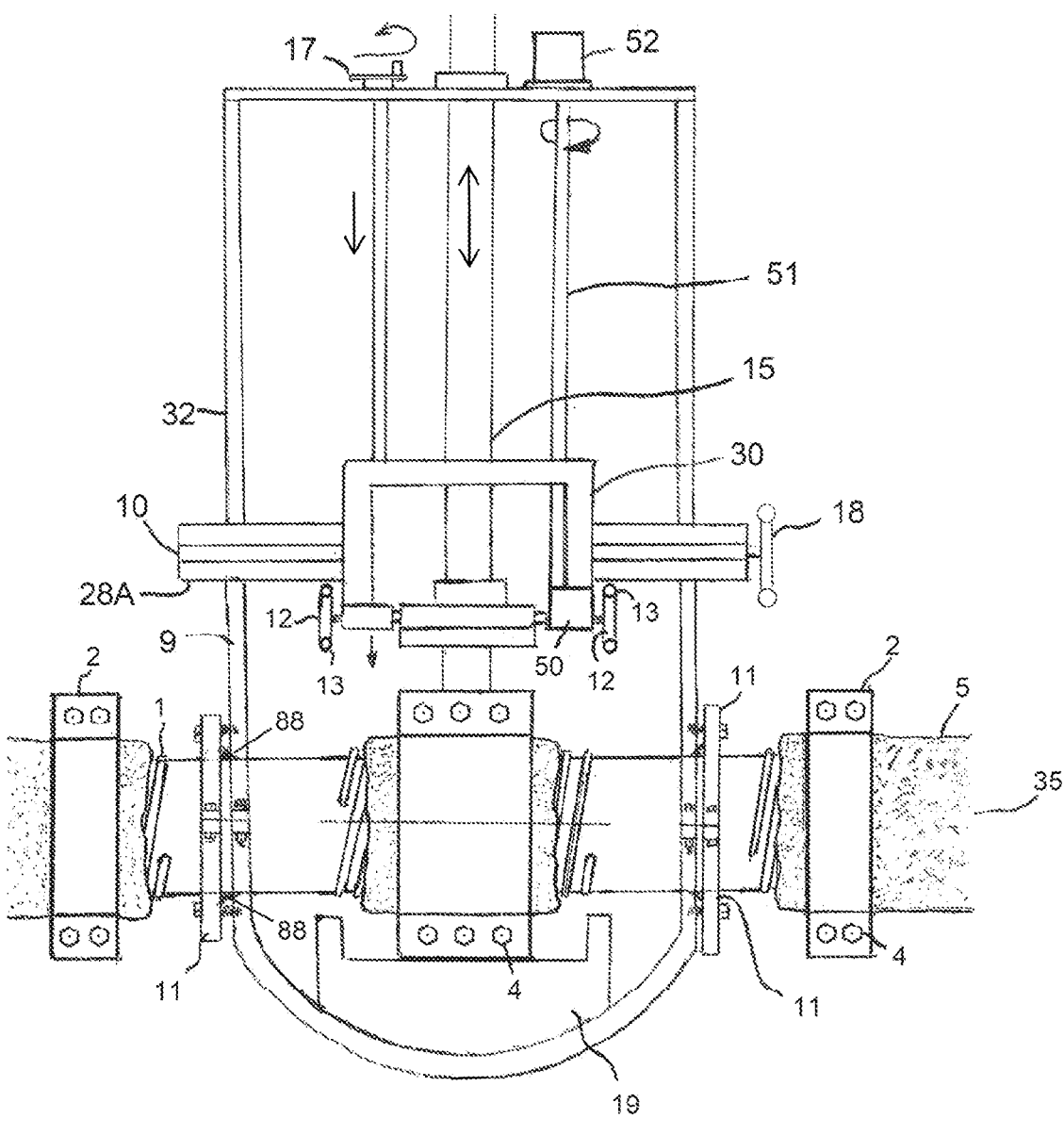
FIG. 7 is a sectional side elevation view that shows a bonnet attached to a service valve. The service valve is in a fully open position, allowing the stabilizing member to advance and retract when the service valve is in the open position. The bonnet shown retains the center clamp's position. A bracket is shown as part of the enclosure to support the proposed section of pipe to be cut during the cutting process and stabilized between these brackets and the stabilizing member.
Figure 8:
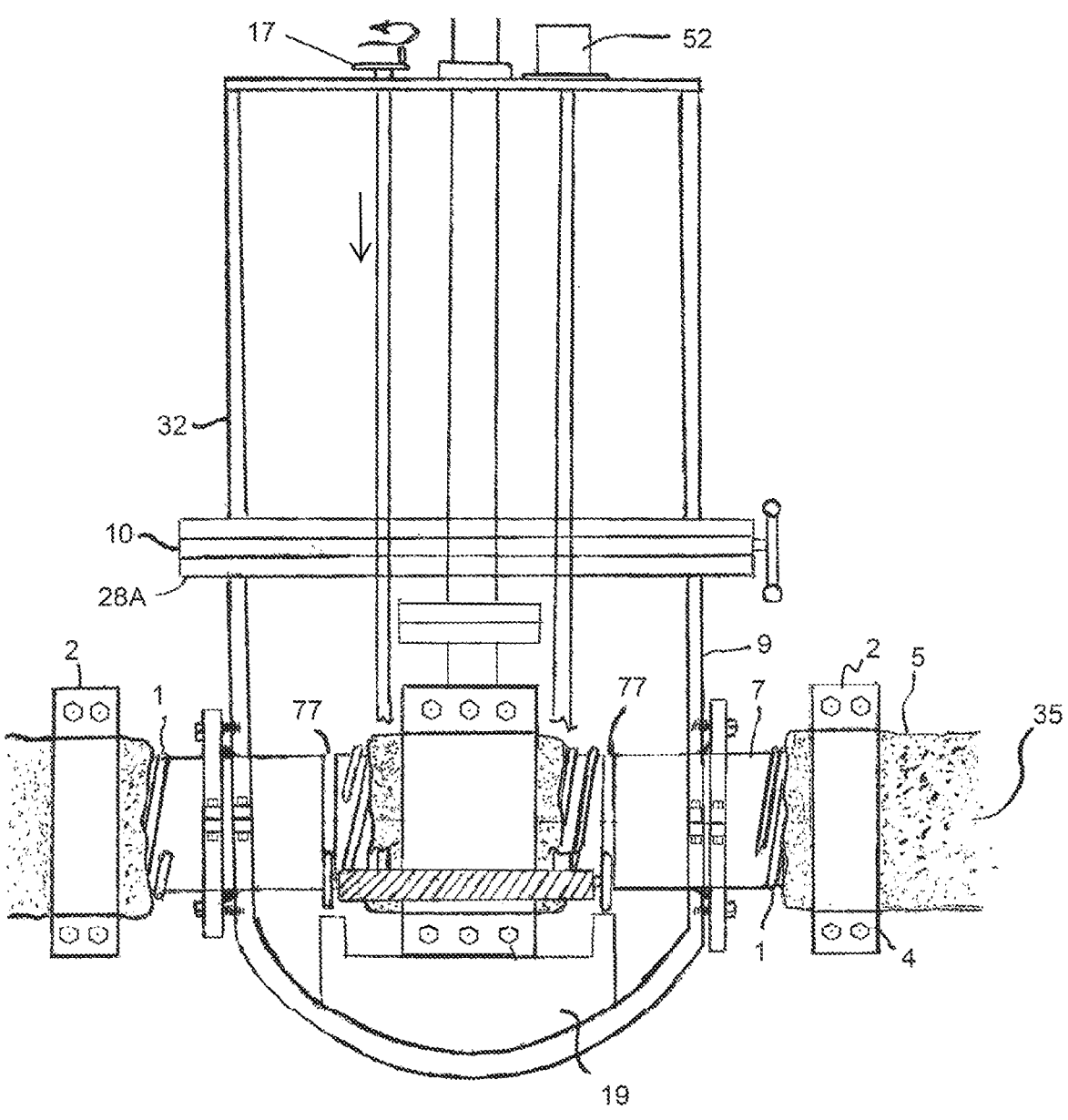

FIG. 8 is a sectional side elevation view of the configuration of FIG. 7 showing the cutting tool having passed completely through the pipe, severing the intended pipe section and revealing the gap left by the cut. This creates two pipe ends of the existing pipe. The illustration also shows the enclosures bracket that have retained the cut section of pipe during the cutting process and the same bracket may help in positioning the new valve into a precise position when installed.

Figure 9:
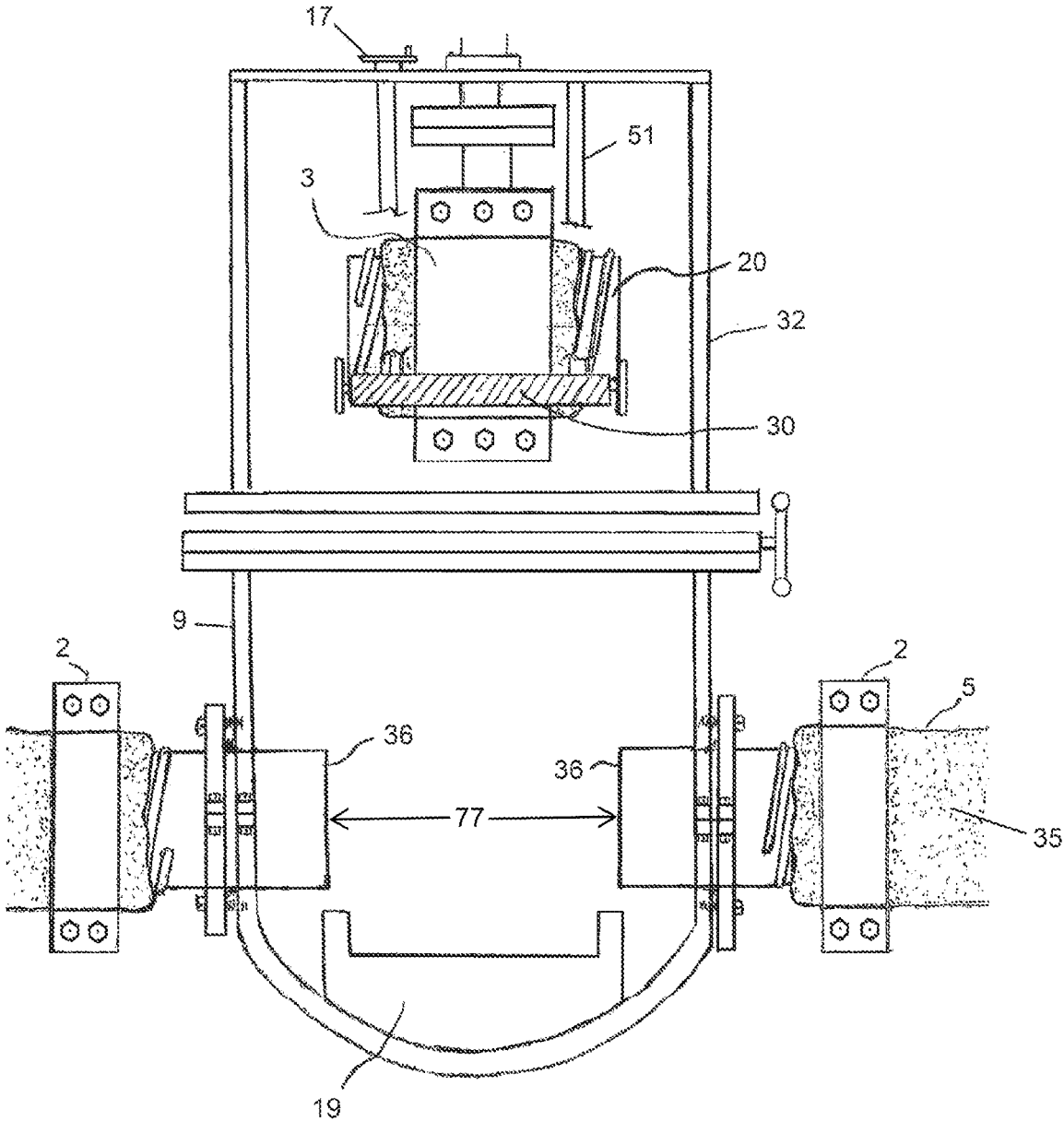

FIG. 9 is a sectional side elevation view of the configuration of FIG. 7 that shows the bonnet and service valve of FIGS. 7 and 8 after severing the pipe. The center restraining clamp and pipe section are both removed together into the housing by retraction of the stabilizing member. This process provides an open area where the new valve will be installed. In addition to the removal of the cut pipe and clamp, the cutting tool is removed from the enclosure into the bonnet and the service valve is closed. The bonnet as shown has been depressurized and removed from the enclosure.

Figure 10:
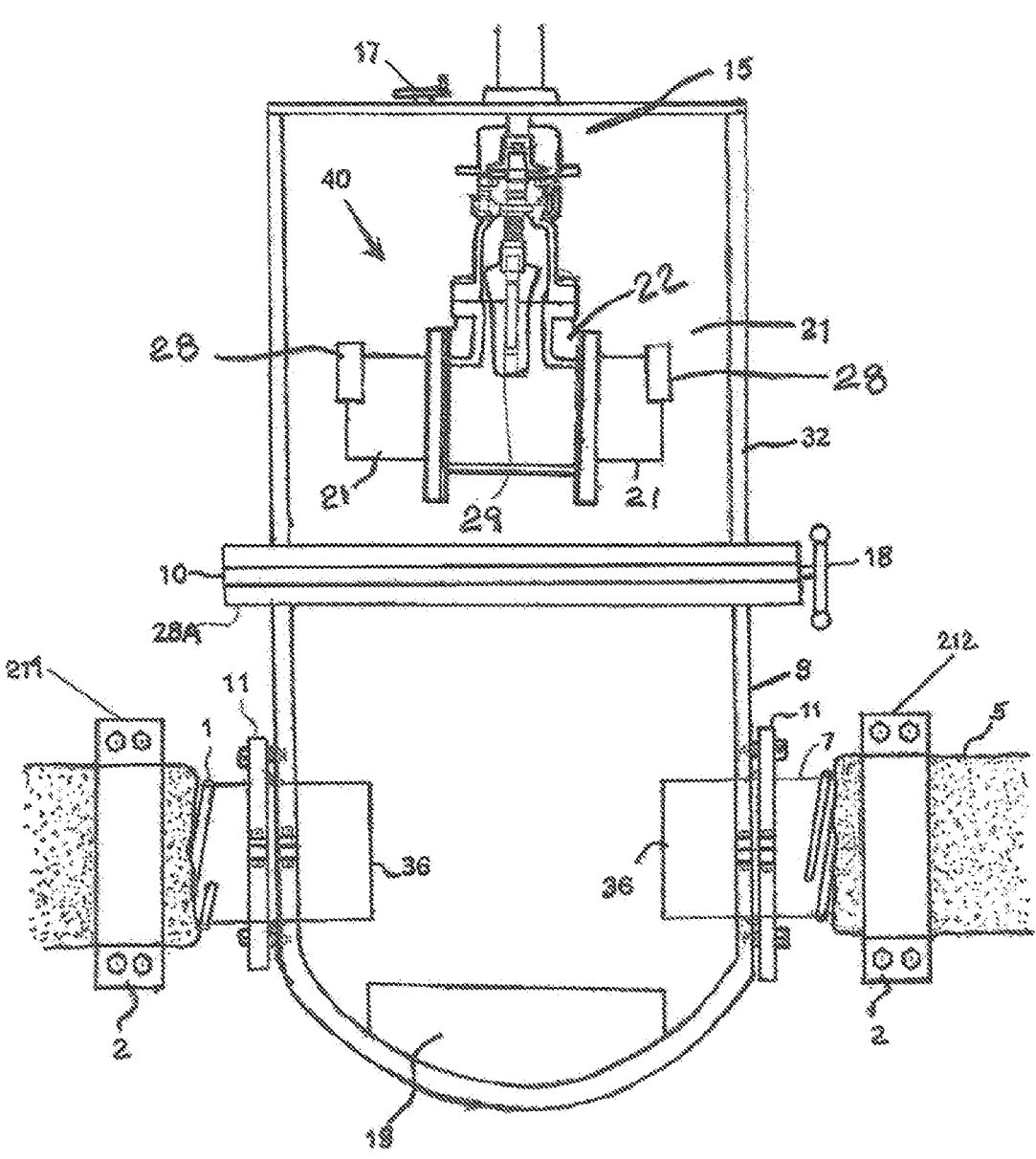

FIG. 10 is a sectional side elevation view of the configuration of FIG. 7 that shows the new valve with attached pipe ends. Both pipe ends have a half circle attached their top that fit the existing pipeline outside diameter O.D. These centering collars provide exact alignment up and down and side-to-side line up between the bores of the new valve ends and the cut pipe ends. The new valve is shown attached to the service tool stabilizing member and retracted into the bonnet by retraction of the stabilizing member. The bonnet is attached onto the service valve in fluid tight arrangement. Once the service valve is fully opened it can allow passage of the new valve into an aligned position within the existing gap left behind by the removal of the cut section of pipe.

Figure 11:
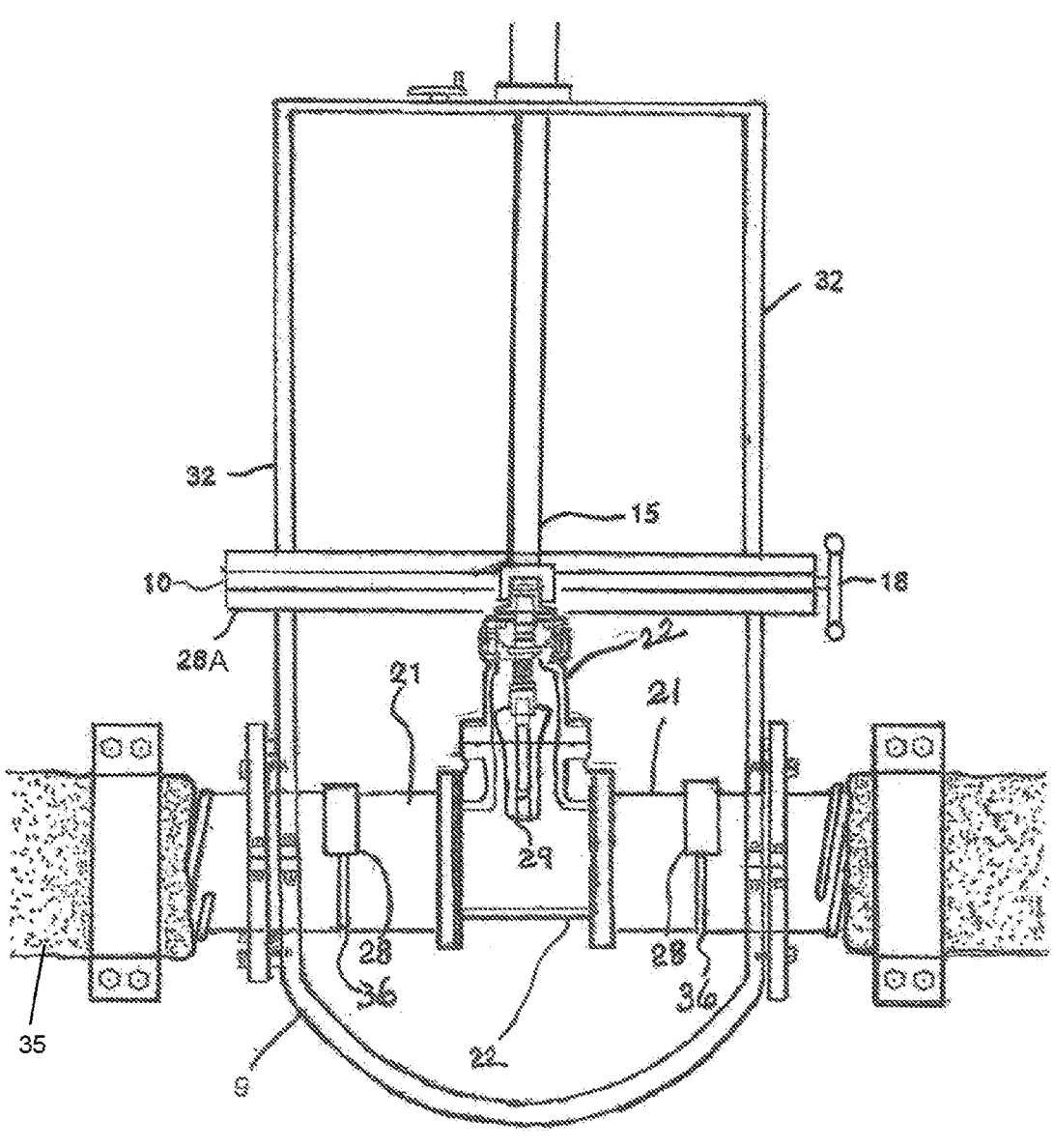
Figure 12:
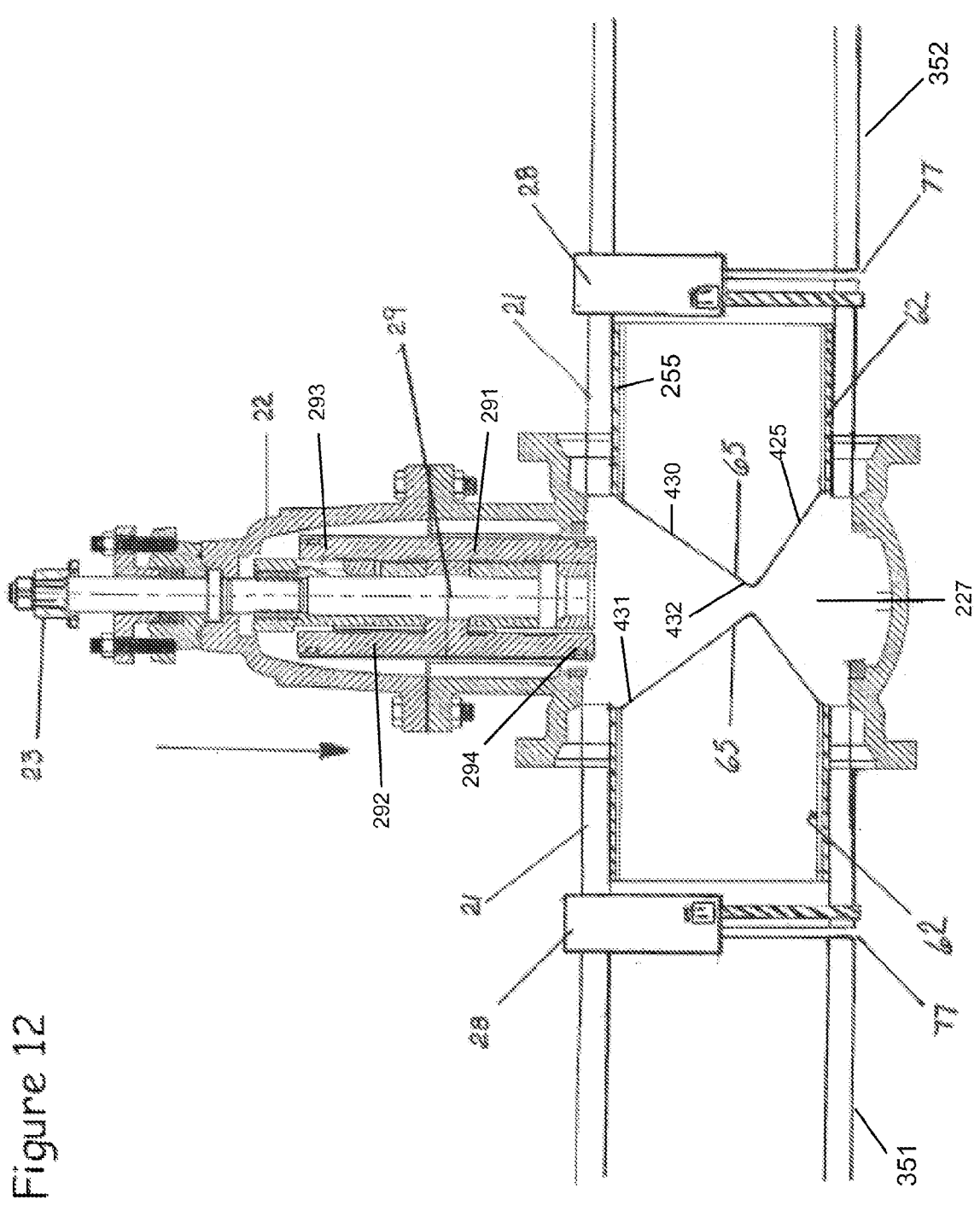
Figure 13:
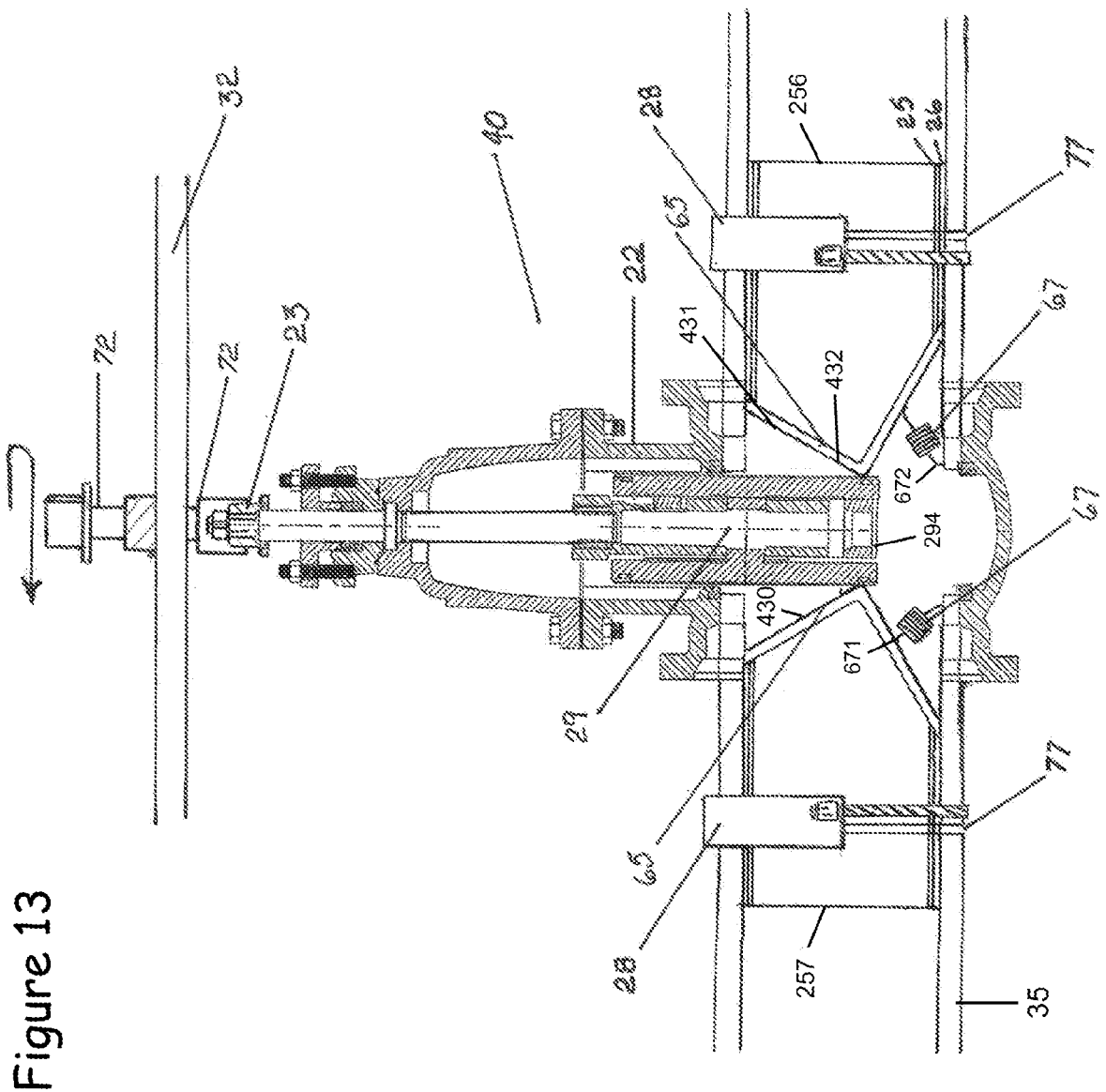

FIG. 11 is a sectional side elevation view of the configuration of FIG. 7 that shows the stabilizing member advanced and placing the new valve into a rigid position with use of the O.D. centering collars. This rigid installation of the valve provides the valve's pipe ends inside diameter bores to be in line with the existing pipes cut ends inside diameter bores. The new valve is stabilized into a position to allow precise alignment of the new and existing pipe bores. FIGS. 12 and 13 show the cut gap 77 between the existing pipe ends and the new valves pipe ends.

FIG. 12 is a side elevation view showing the new valve installed within the removed gap and opposing new valve ends installed in direct alignment with existing pipe ends. Cut-covering assemblies provide a cylinder member for strength with tapers and sealing material housed within the pipe ends of the new valve ends. The cut covering assemblies can be provided to match the different shapes of new valve's pipe ends. The cut-covering assemblies when advanced are long enough to remain in a portion of the new valve pipe ends, cover the cut gap in the pipe, and enter into the existing pipe ends. The O.D. (outside diameter) centering collars provide alignment between the new valve pipe ends and the existing pipe ends in uniform fashion.

Figure 12A:
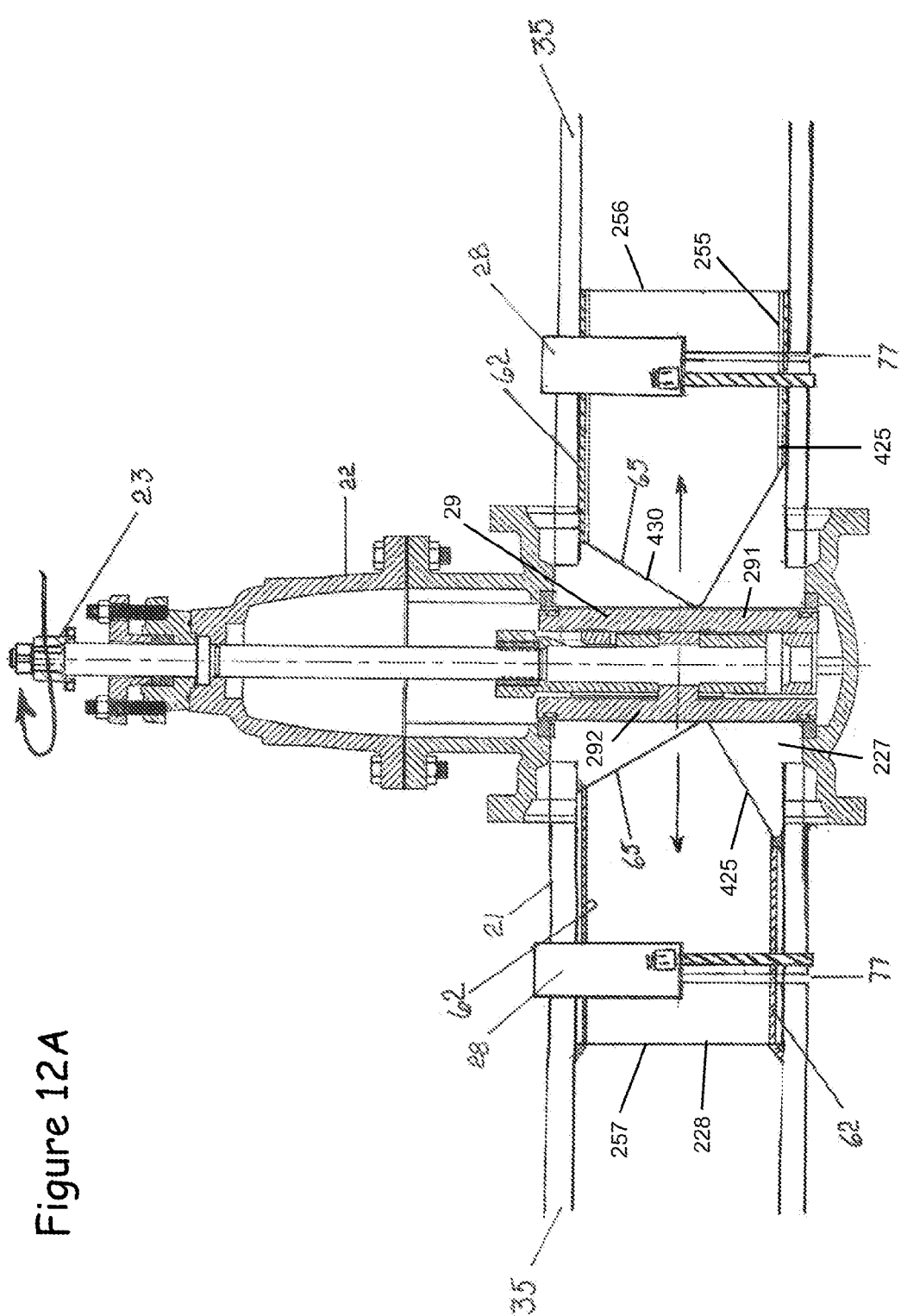

FIG. 12A. shows the gate being moved into the waterway of the valve in linear fashion by activation of the valve feed nut. The movement forces the gate against the wedged shaped surfaces of the traveling cut covering assemblies to push or move the cut-covering assemblies as shown by outward pointing arrows to traverse over the gap and into the existing pipe bores to complete sealing arrangement.

FIG. 13 is a side sectional view that depicts the new valve ends being installed in direct alignment with the existing pipe ends by a service tool stabilizing member. The new valve is shown to be closing by using a rod that passes through the service tool and bonnet and is connected to an operating nut on the gate valve. A seal is provided on the bonnet to keep fluid from escaping. Turning the operating mechanism in the direction that closes the new valve, both cut-covering assemblies (one on each side of the new valve) are evenly pushed by direct engagement by gate movement.

The movement by closing the gate isolator of the valve keeps the cut-covering assemblies evenly moving to a predetermined location. The gate valve, as it is closed, produces linear movement that engages with tapered/sloped ends of the cut-covering assembly, and as the gate continues to travel it pushes the cut-covering assemblies from within the new valve pipe ends, over the cut gap, into both existing pipe ends to provide the intended location of the seal. A cross brace structure is not used in this embodiment. The whole cut-covering structure assembly is shown as being moved by gate engagement against opposing tapered cylinders and the gate can freely slide along the tapered cylinder as the linear movement progresses to push the cut-covering assemblies into a sealing position. This engagement moves both sides of the cut-covering assemblies away from the new valve's isolator at the same time and rate to a shown position where the cut-covering assemblies can move from the new valve pipe ends, cover a gap, and move into the existing pipe openings. This procedure allows both cut-covering assemblies to be gently placed into position ready for depressurization that will seal the new valve's pipe ends with the existing pipe's interior walls.

Figure 14:
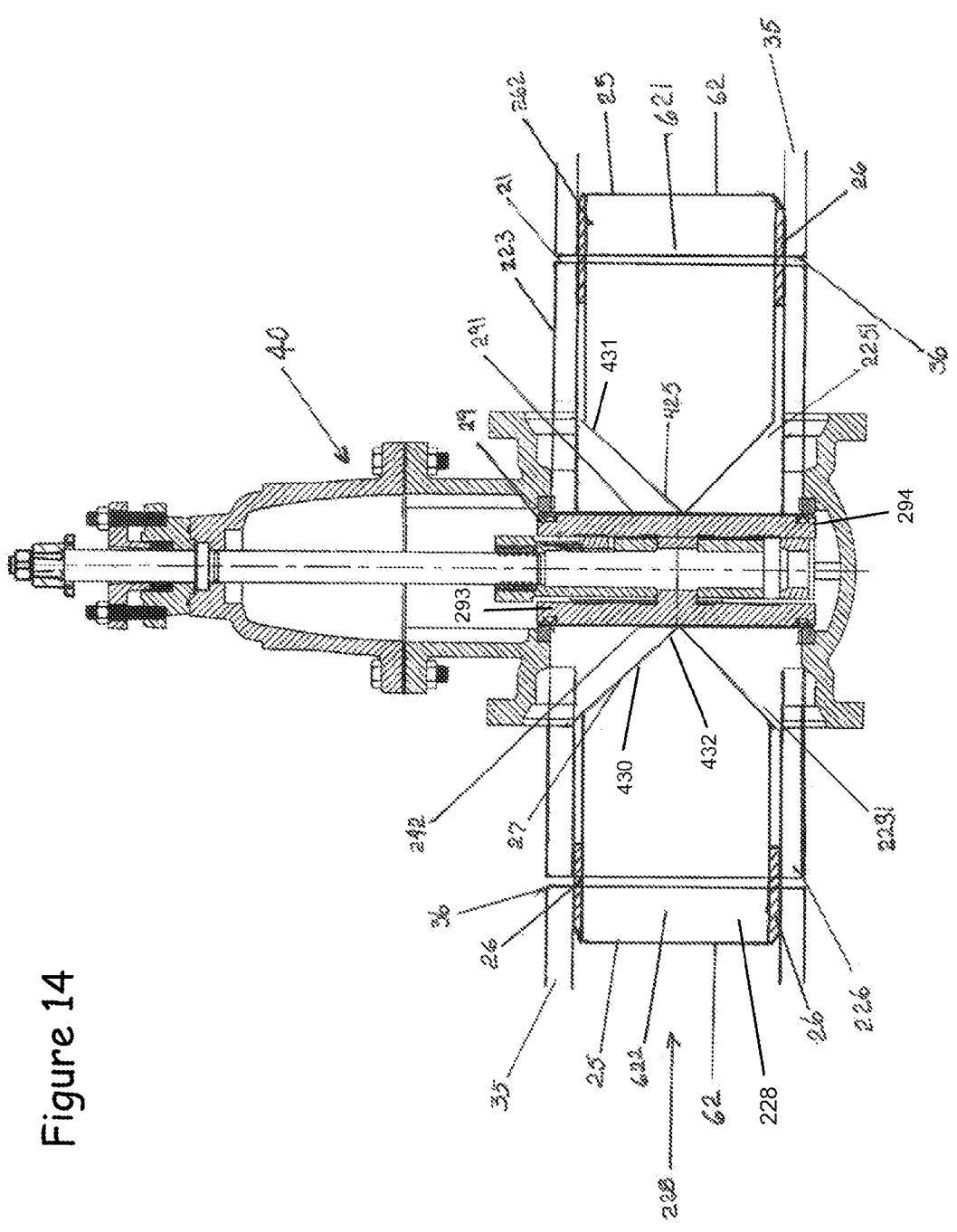

FIG. 14 shows one embodiment in which the right side cut-covering assembly is positioned in an interior of the right-side cylinder and a left side cut-covering assembly is positioned in an interior of the left side cylinder.

Both cut-covering assemblies are shown to be moved out of opposing cylinders or pipe ends of the new valve.

Figure 15:
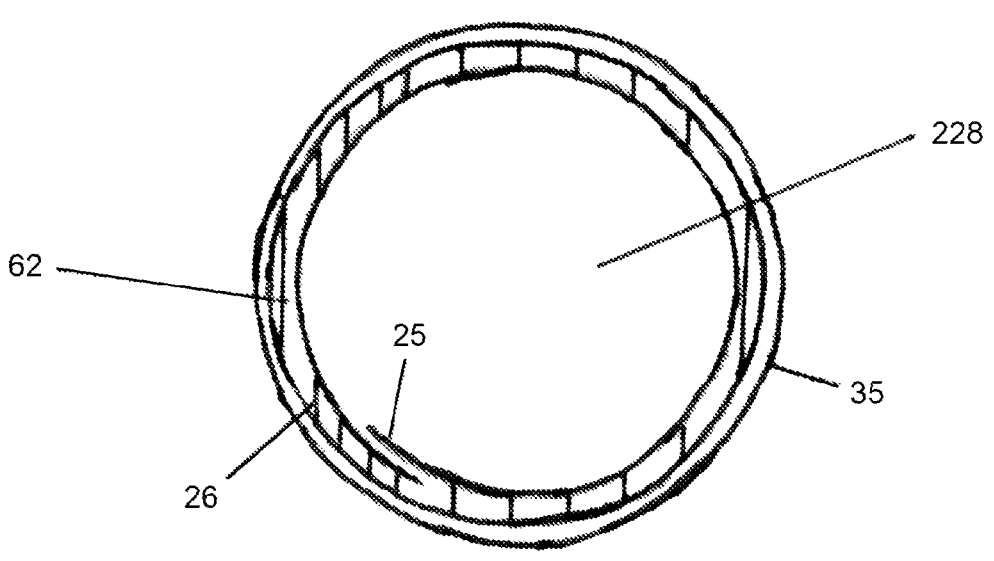

FIG. 15 is a sectional view of the cut-covering assembly. The outside circle is an existing pipe wall cylinder, the hashed-marked area is a rubber or flexible sealing material or compound, and the overlapping internal line drawn incorporates a split tube that may be rolled to provide spring-type expansion and can be pulled together prior to being inserted into the new valve ends. The spring-type tube will naturally want to expand, creating a slight force on the sealing member along the pipe's interior in the new valve's pipe ends or the inside diameter of the existing pipeline as it advances.

Figure 16:
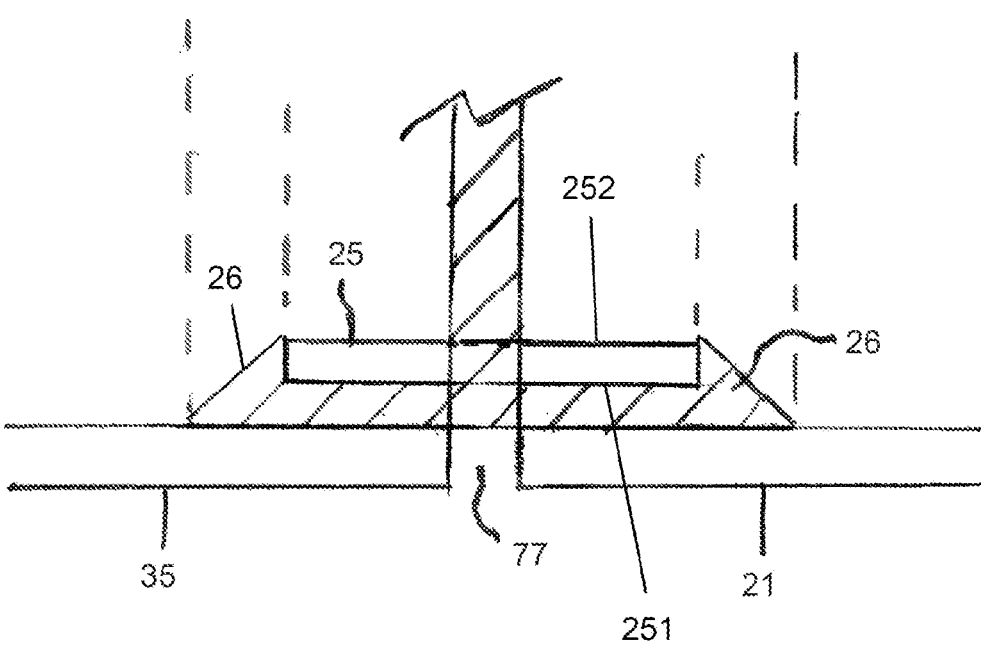

FIG. 16 is a sectional view showing an embodiment of the sealing portion of the cut-covering assembly and how the rubber can be held in position in relationship with the tube or spring tube. The cut-covering assembly seal is covering the remaining gap cut in the pipe, a portion of the existing pipe interior, and a portion of new valve pipe interior. The gap is shown above the seal design and is covered continually around the whole inside diameter of the pipe to create a fluid-tight seal of the gap. Alternatively, the cut-covering assembly may be reversed so that the rubber or flexible material covers the spring tube and the spring tube rides directly against the inside pipe ends, and the existing pipe openings and the rubber covers the steel tube.

Figure 17:
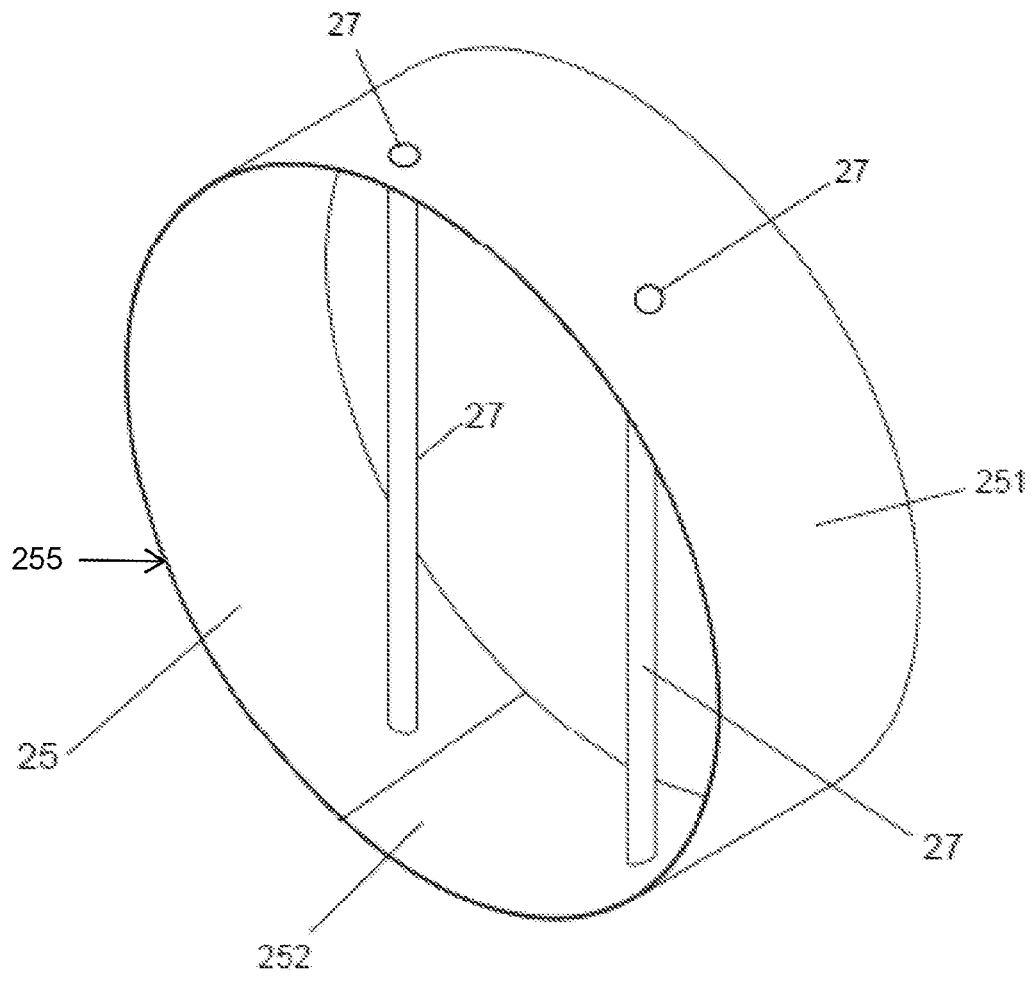

FIG. 17 is a perspective view of a spring tube with cross braces as part of the cut-covering assembly. Cross braces can be selectively provided at a tapered angle so the gate isolator can contact and push the cut-covering assemblies in a linear direction to cover and seal the gap.

Figure 18:
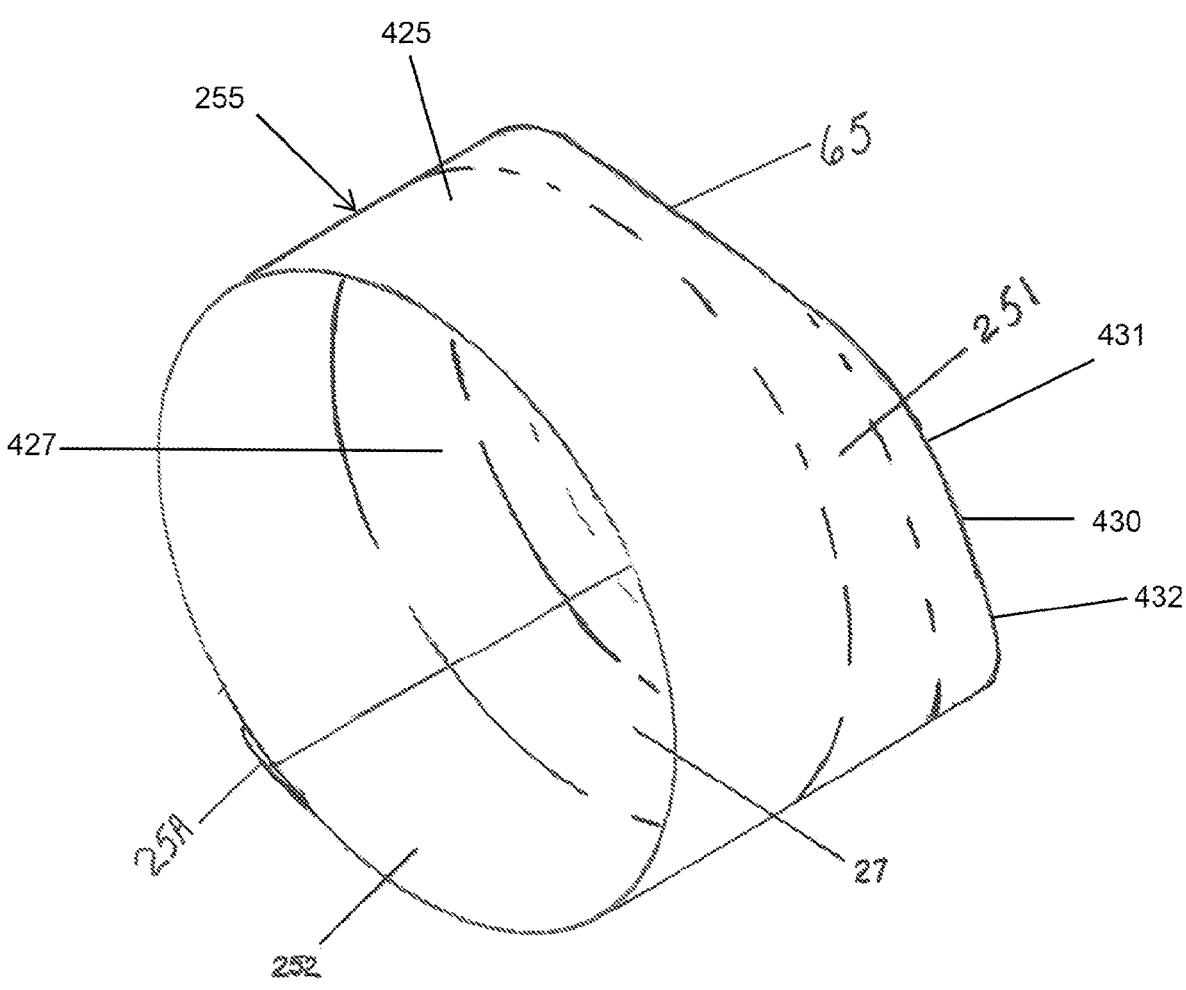

FIG. 18 is a perspective view of a split tube that can incorporate sloped ends, i.e., wedge-shaped cut covering tapers, that encourages movement by the new gate valve isolator when the new gate valve isolator moves.

Figure 19:
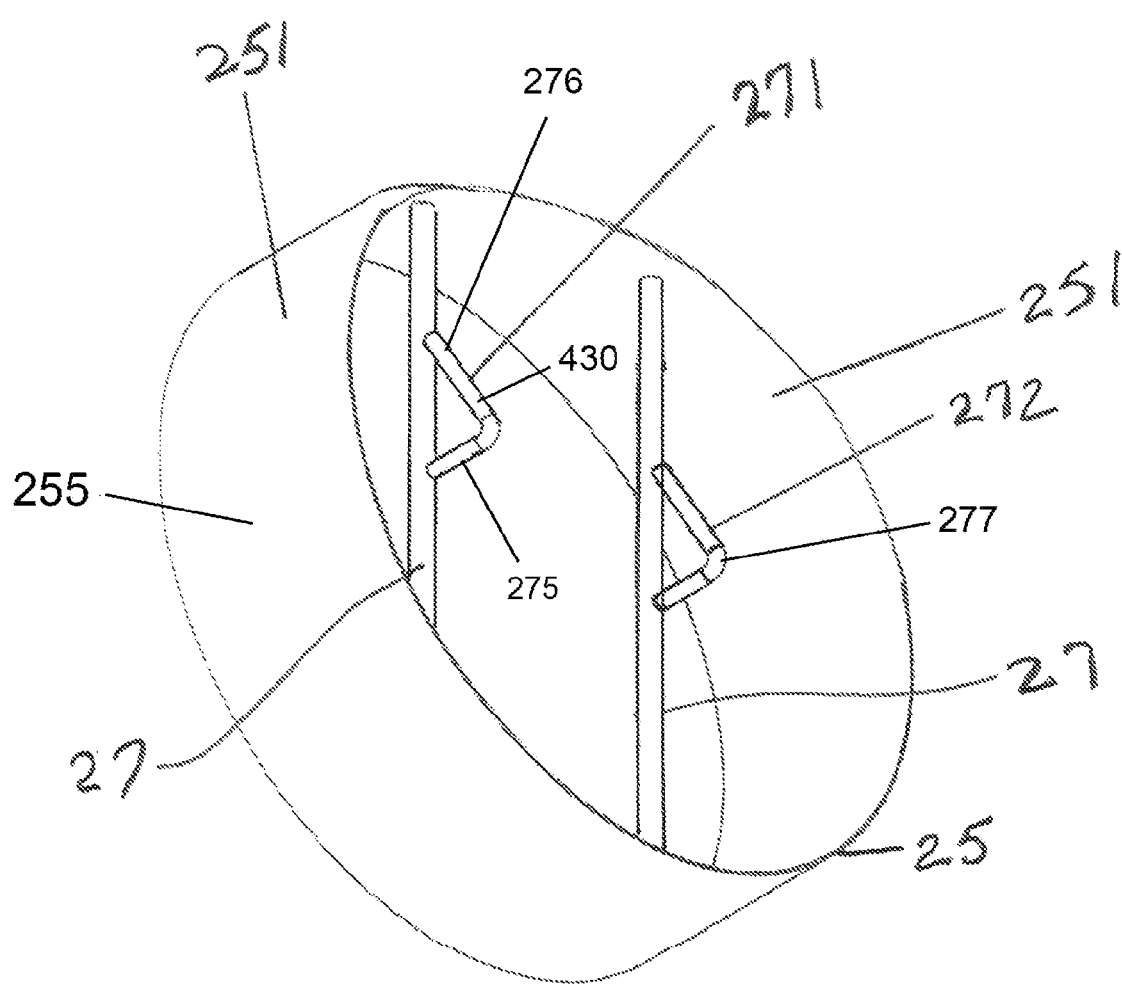

FIG. 19 is a front perspective view of the split tube and cross braces of the embodiment of a cut-covering assembly of that uses cross braces to achieve movement by the new gate valves isolator linear movement.

Figure 20:
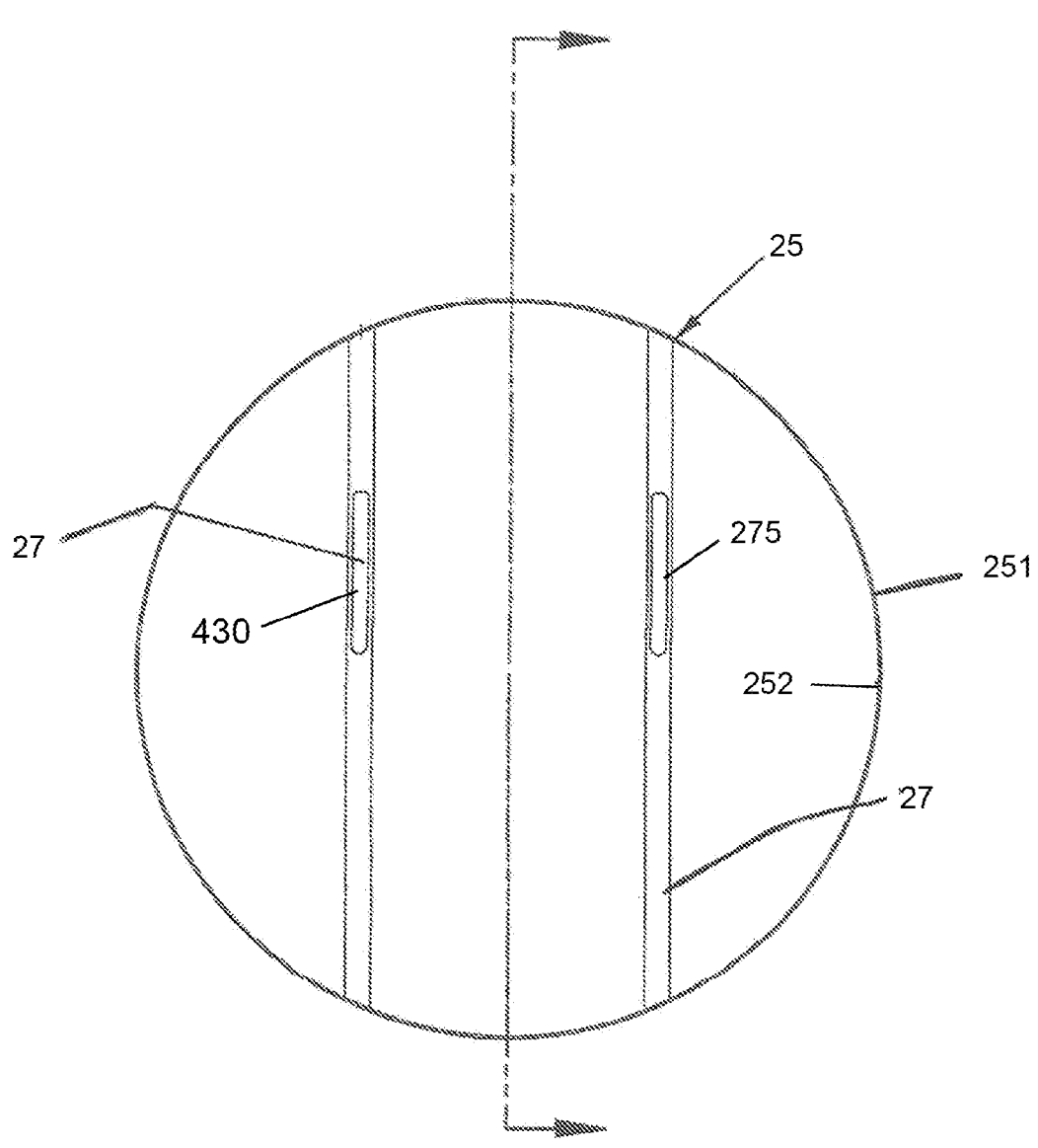

FIG. 20 is a front plan view of the split tube and tapered cross braces of the cut-covering assemblies.

Figure 21:
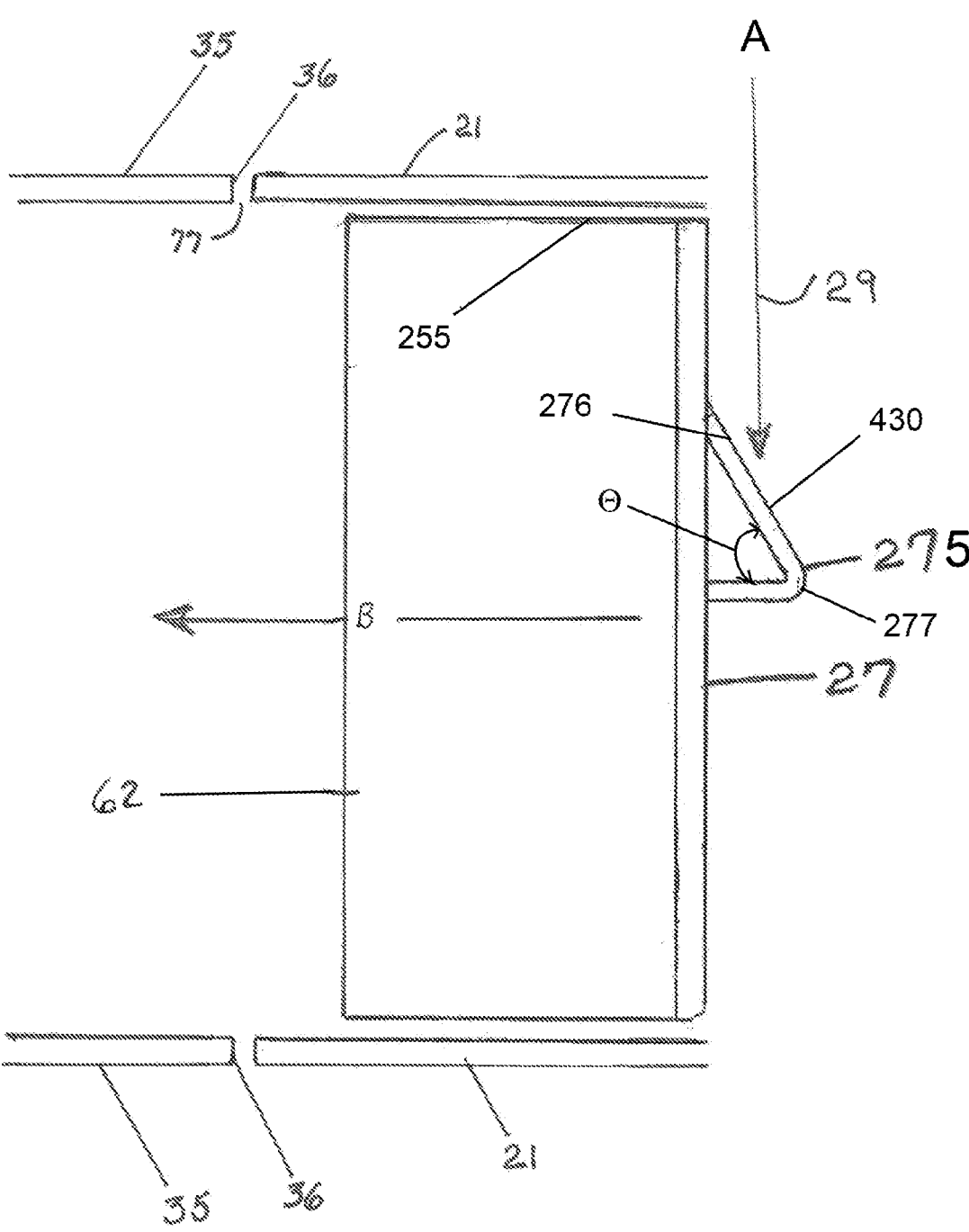

FIG. 21 is a side cutaway view shown by arrows 20-20 in FIG. 20, showing how the gate and cut-covering assembly can be designed to fit together to create a wedging effect that produces linear movement of the cut-covering assemblies by the gate's downward movement to enable the covering of gaps between the existing pipe ends and the new valves ends.

Figure 22:
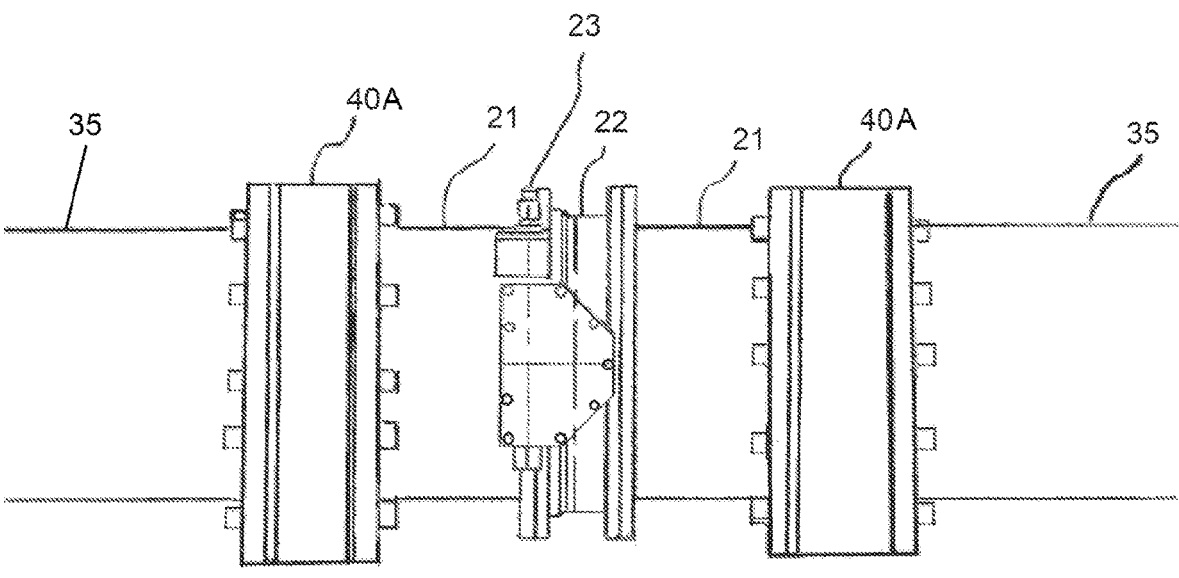

FIG. 22 is a side elevation view that presents a completely inserted valve with industry known permanent fittings attached over the cut gap to seal. The typical fitting is known in the industry as a standard "coupling". The coupling permanently covers and seals the gap that was temporarily internally plugged by the cut-covering assembly, thereby completing the method of inserting a valve into a live pipeline. These couplings can be installed loose on the new valve's pipe ends during insertion so that split style couplings may not have to be used.

Figure 23:
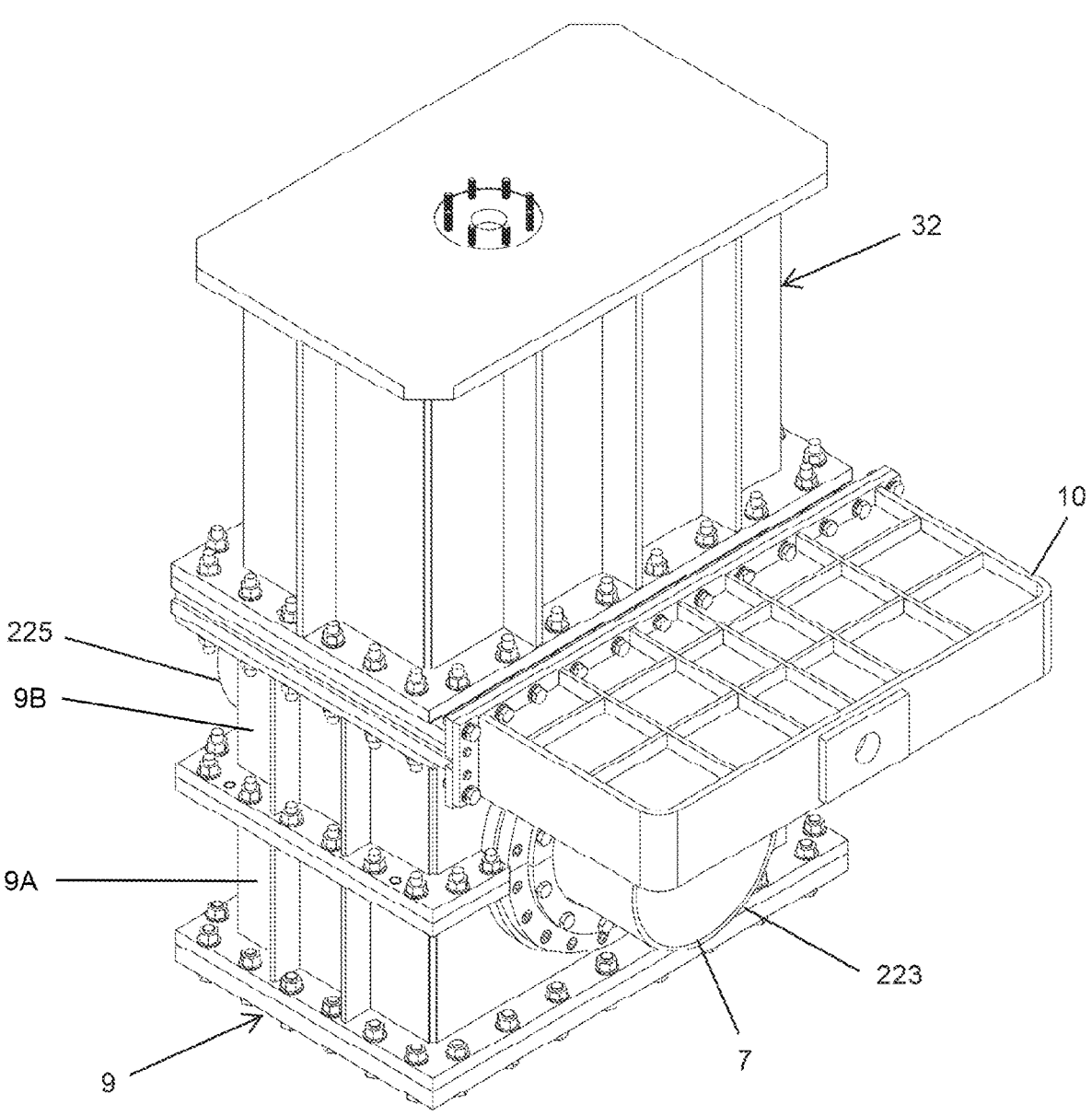

FIG. 23 is a perspective view of the pressurized enclosure housing including service valve and bonnet assembled around an existing pipeline.

Figure 24:
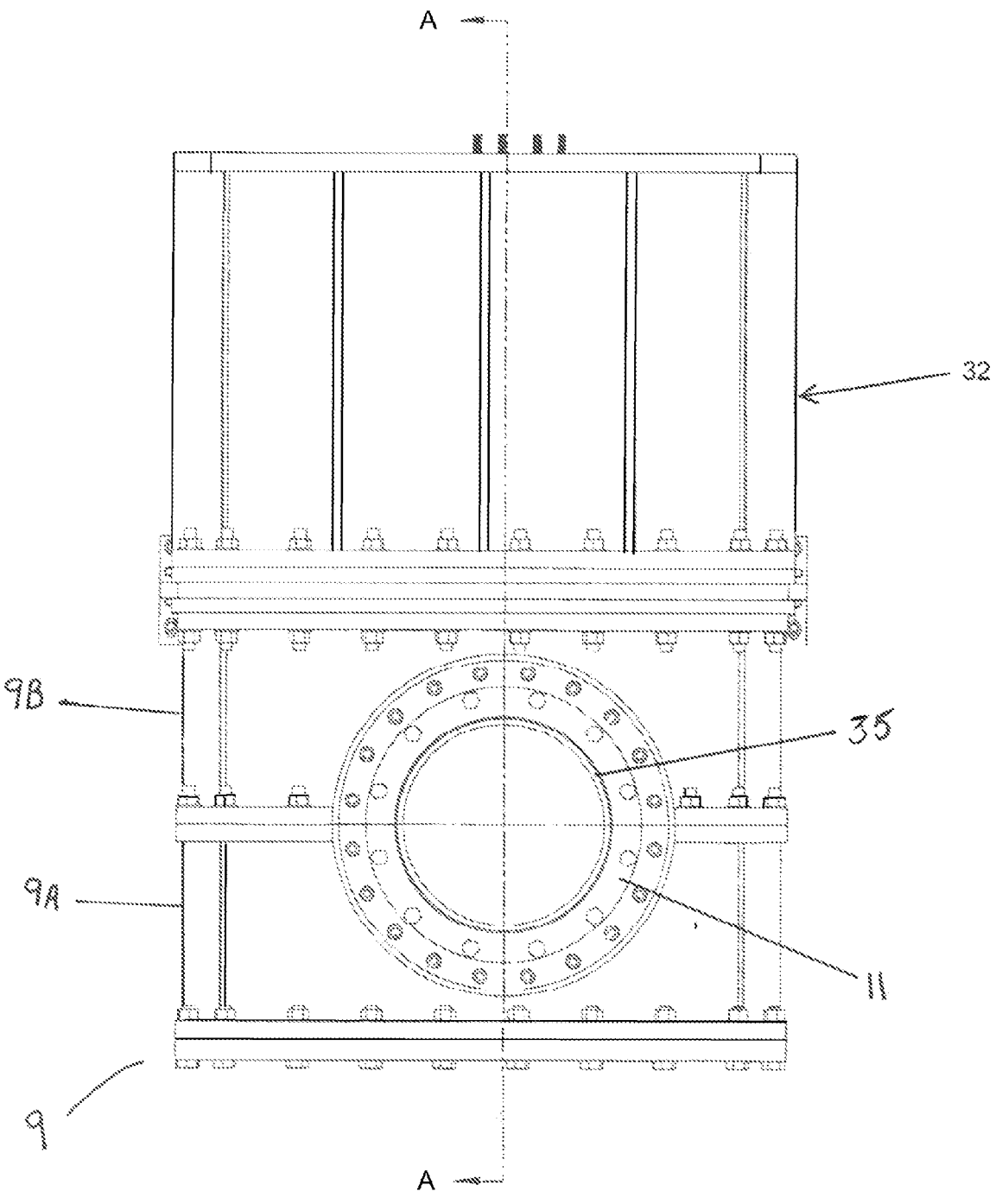

FIG. 24 is a front view of the pressurized enclosure housing including a service valve and bonnet assembled onto existing pipeline.

Figure 25:
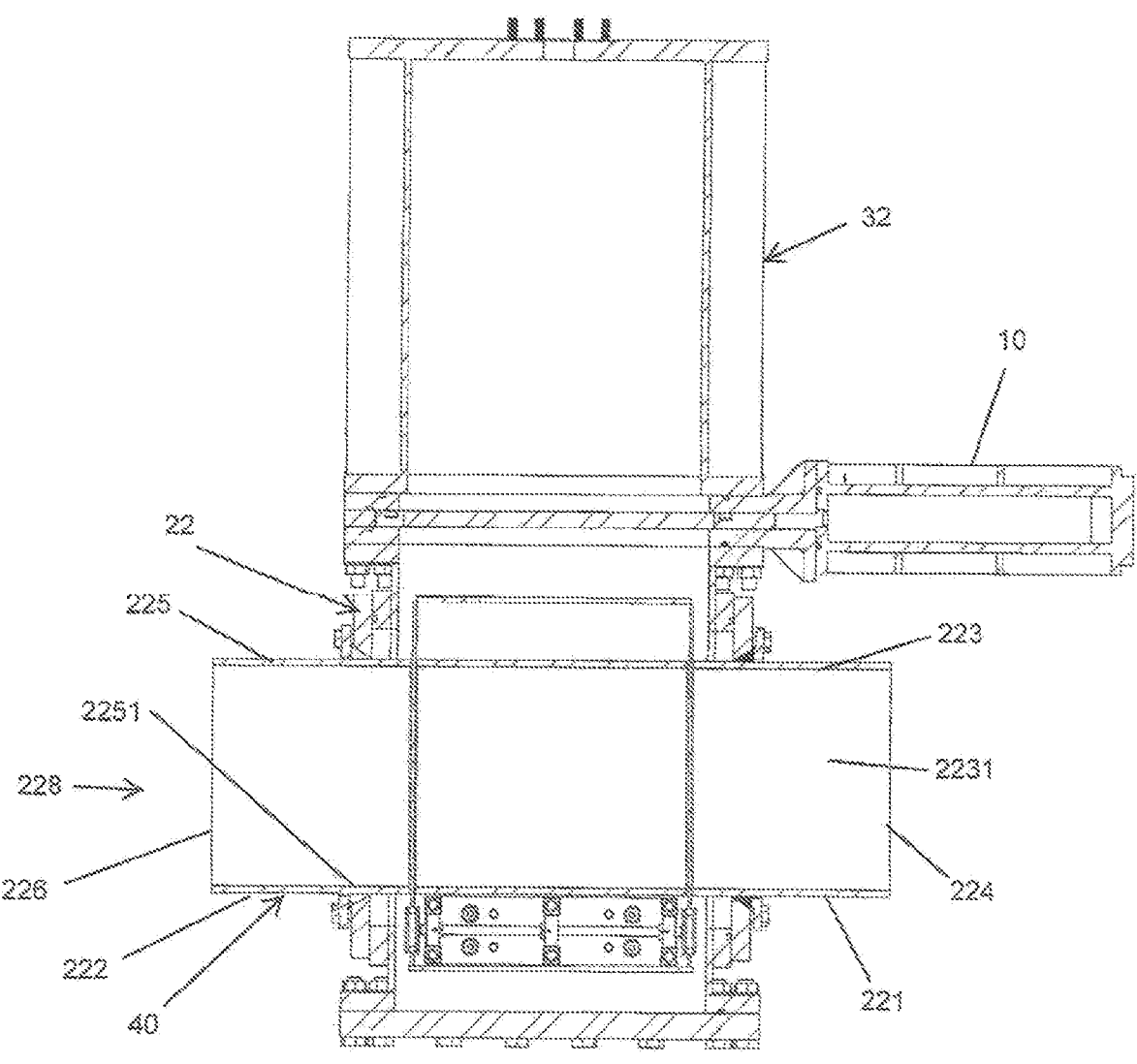

FIG. 25 is a side sectional view of the pressurized enclosure housing including service valve and bonnet assembled onto existing pipeline, showing the replacement valve assembly, service valve and bonnet with cutting tool installed, along line A-A of FIG. 24.

Figure 26:
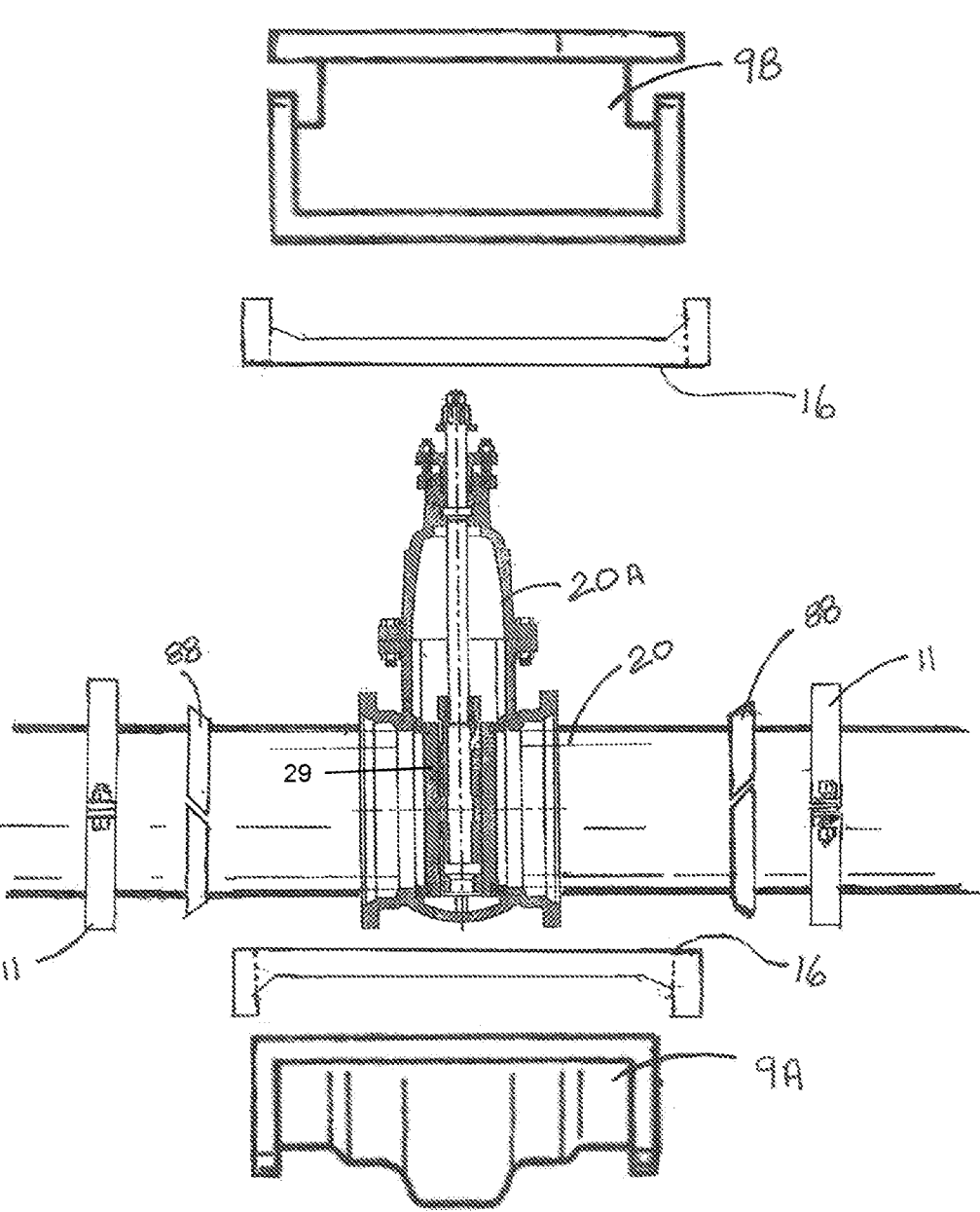

FIG. 26 shows in more detail how a pressure enclosure housing can be assembled around a pipeline and any encompassed appurtenances on the pipe in fluid tight fashion. This drawing shows an existing valve within the pipe section to be removed. Wet tapping includes a known way to cut and remove a section of pipe, this invention uses it to install a new valve under pressure by use of a wet tapping tool. In this case a hole-saw large enough to cut and remove the whole pipe is provided. A portion of the structure of the pressurized housing can remain if desired. The illustration shows a strong back that is installed as part of the pressurized enclosure.

Figure 27:
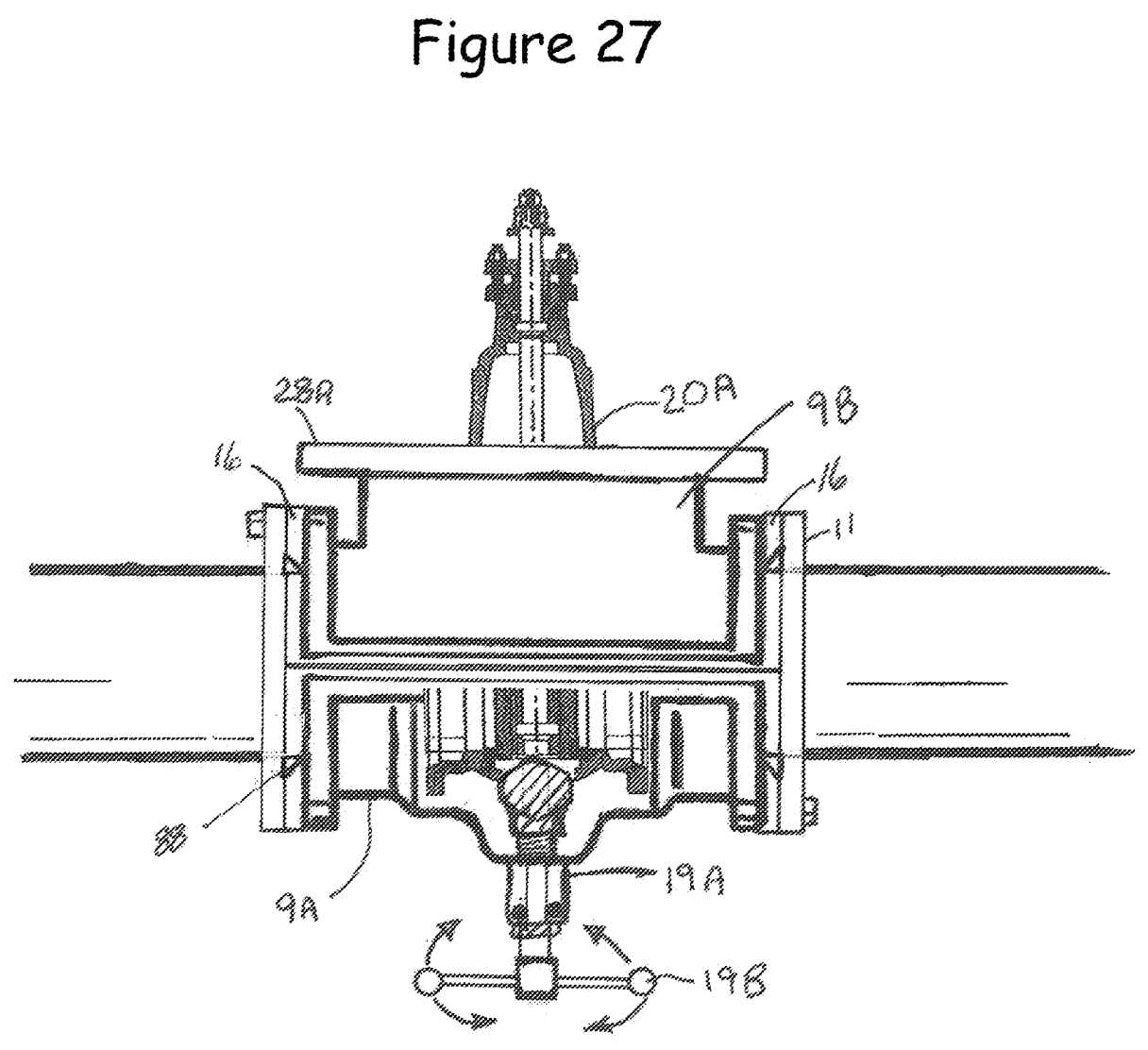

FIG. 27 shows the pressure enclosure housing installed onto the pipeline surrounding an existing valve installed within the pipe section to be abandoned. The adjustable support bracket is shown moved tight against the existing pipe section here is a valve within the pipe section. It is advanced externally from outside the pressurized enclosure to make contact with the section of the pipe to be cut and removed. Contact by adjustable support provides stability for cutting. Included is an adjustable support bracket for the existing pipe section, which is adjustably actuated from outside the pressure enclosure housing to support the pipe and appurtenances.

Figure 28:
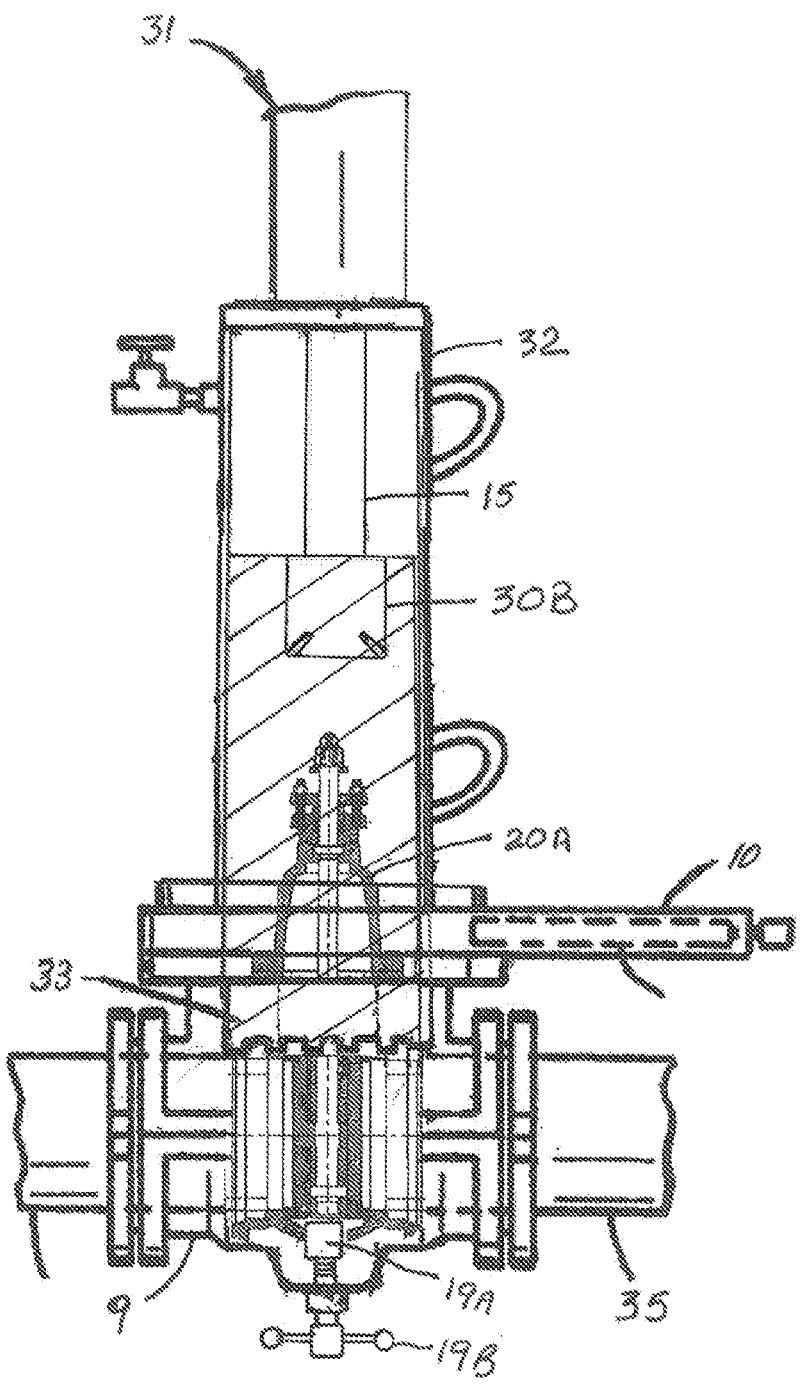
Figure 29:
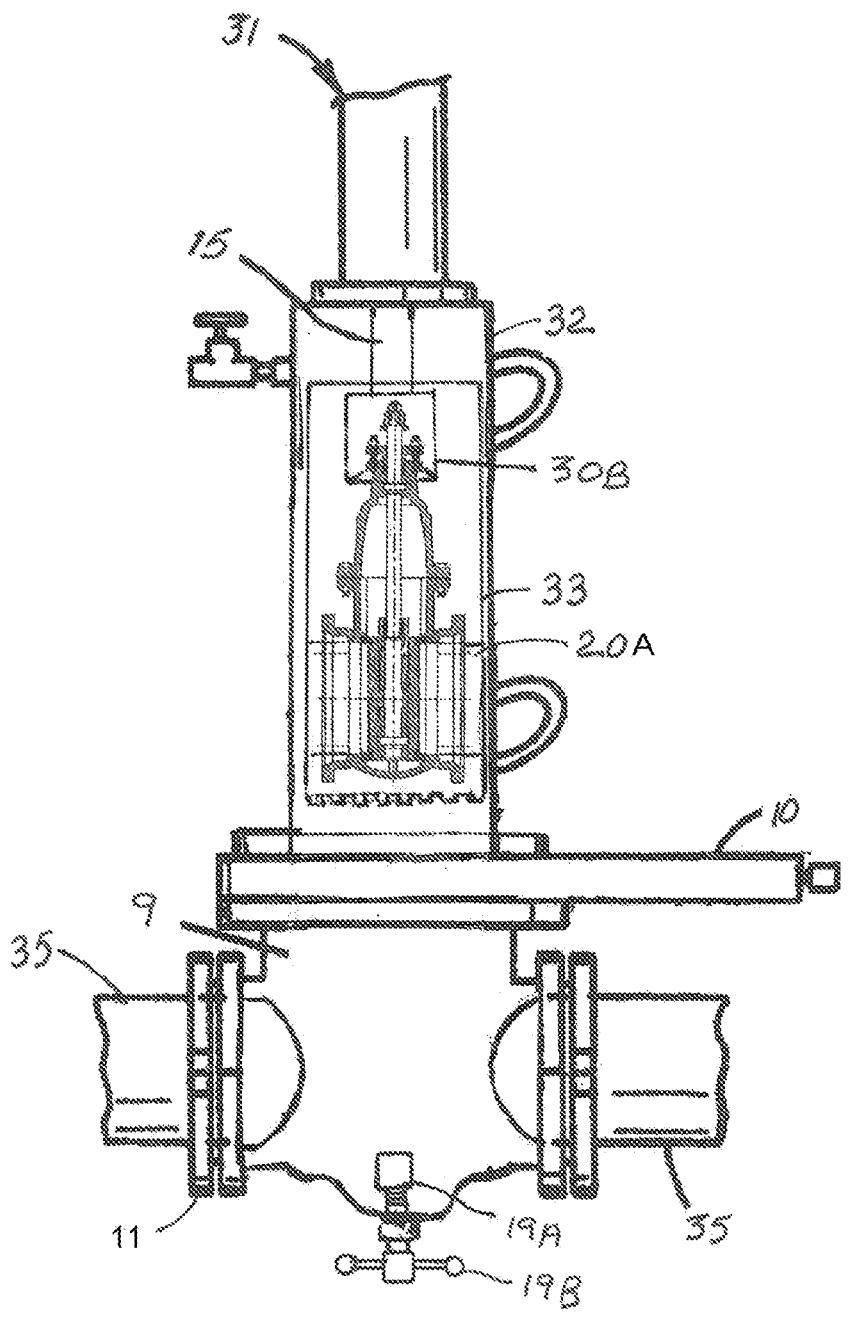

FIG. 28 indicates the hole-saw preparing to cut through the pipe in two locations by the hole-saw, the wet tapping tool provides a retaining member as shown intended to capture the existing valve to be removed with the cut section of pipe. The adjustable support bracket can be lowered externally outside of the enclosure to make room for the FIG. 29 shows the pipe section within the hole-saw that included an existing valve to be removed. The pipe section and valve within pipe within section are retained within the hole-saw by the retaining member and all are retracted above the service valve and housed within the wet tapping tool upper bonnet (cutter housing). The wet tapping machine with its housing can be removed at this time. The jackscrew adjustment is shown to be slightly lowered after the cutting and removing the valve selectively make room for the replacement new valve.

Figure 30:
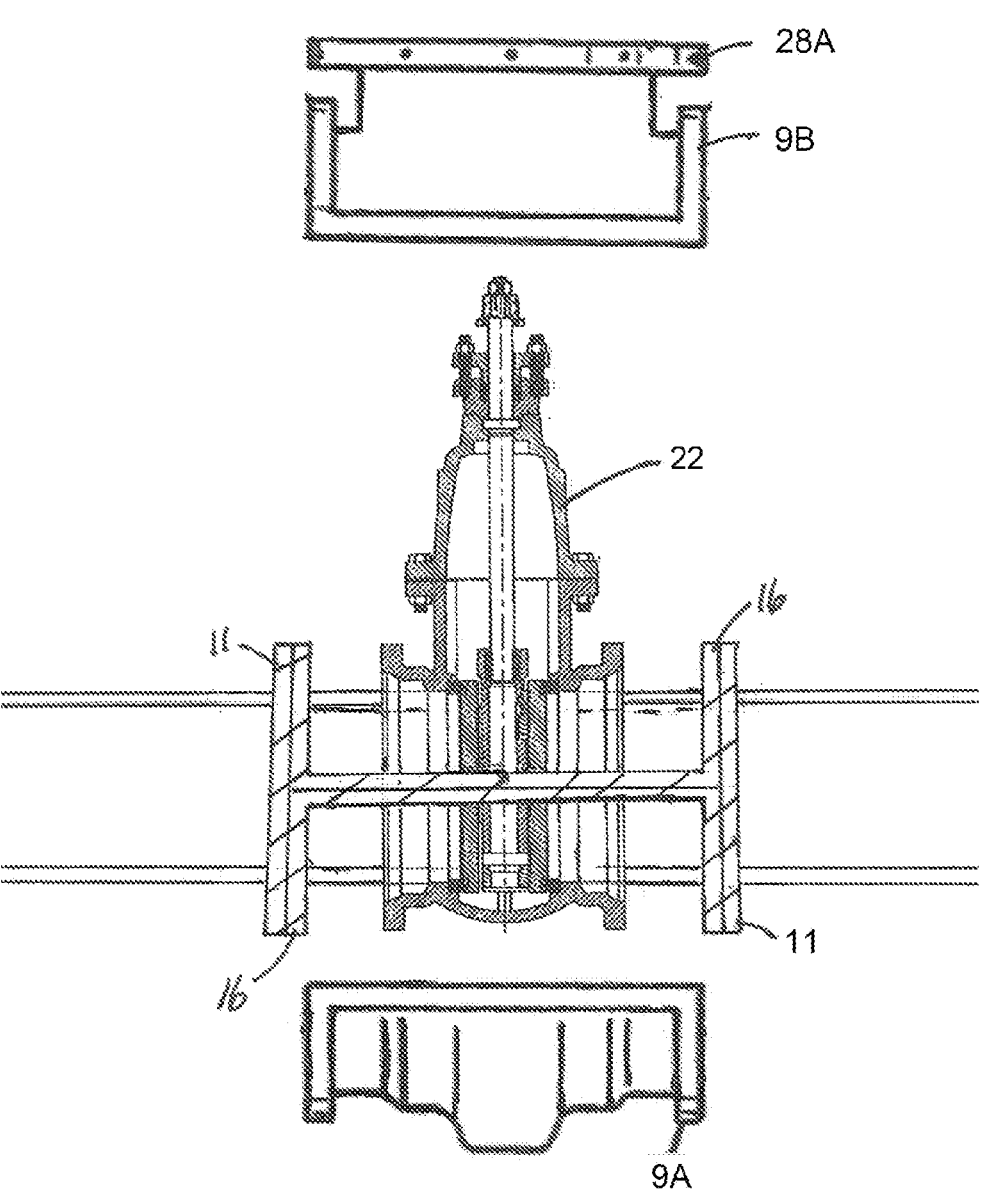

In FIG. 30, the wet tapping tool has set the new replaced valve into position and has moved the new replaced valve gate isolator to set the cut-covering assemblies into the existing pipe ends to seal. The pressurized upper and lower housing shows to be selectively removed as desired. The strong back is shown to remain temporarily or permanently as desired.

Figure 31:
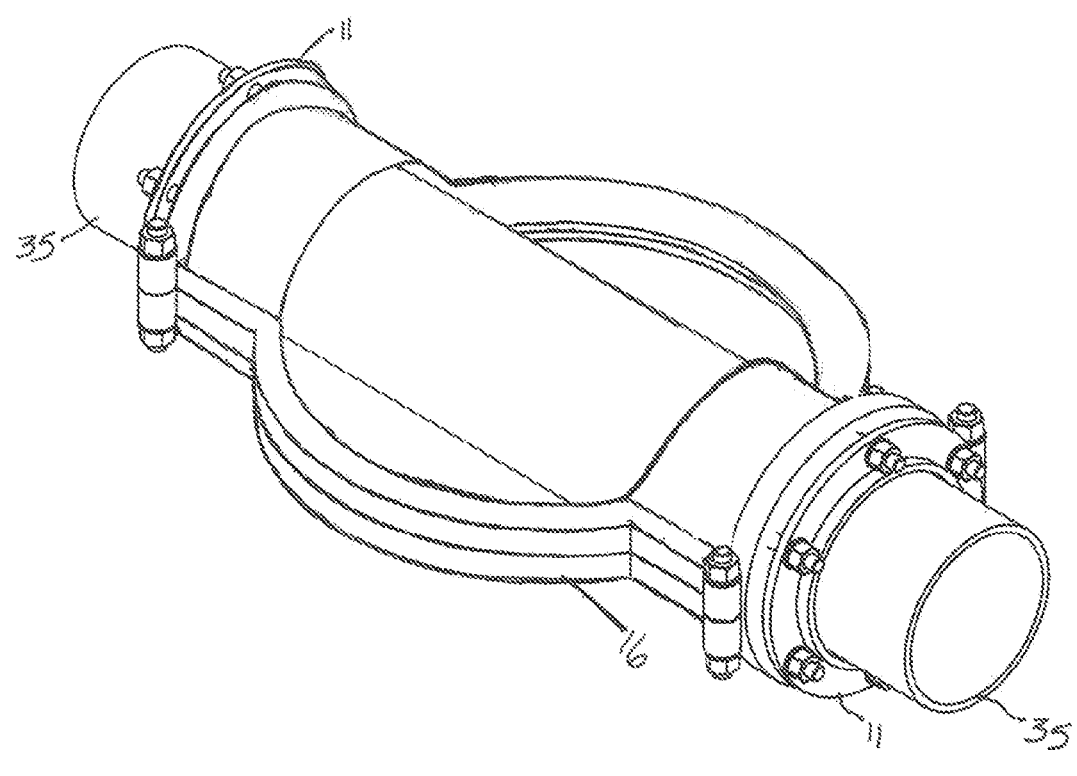

FIG. 31 shows one embodiment of the restraining portion being a strong back that can be left to hold the pipe assembly together. This can be left in place until another means of restraint can be installed or selectively left permanently if desired.

Figure 32:
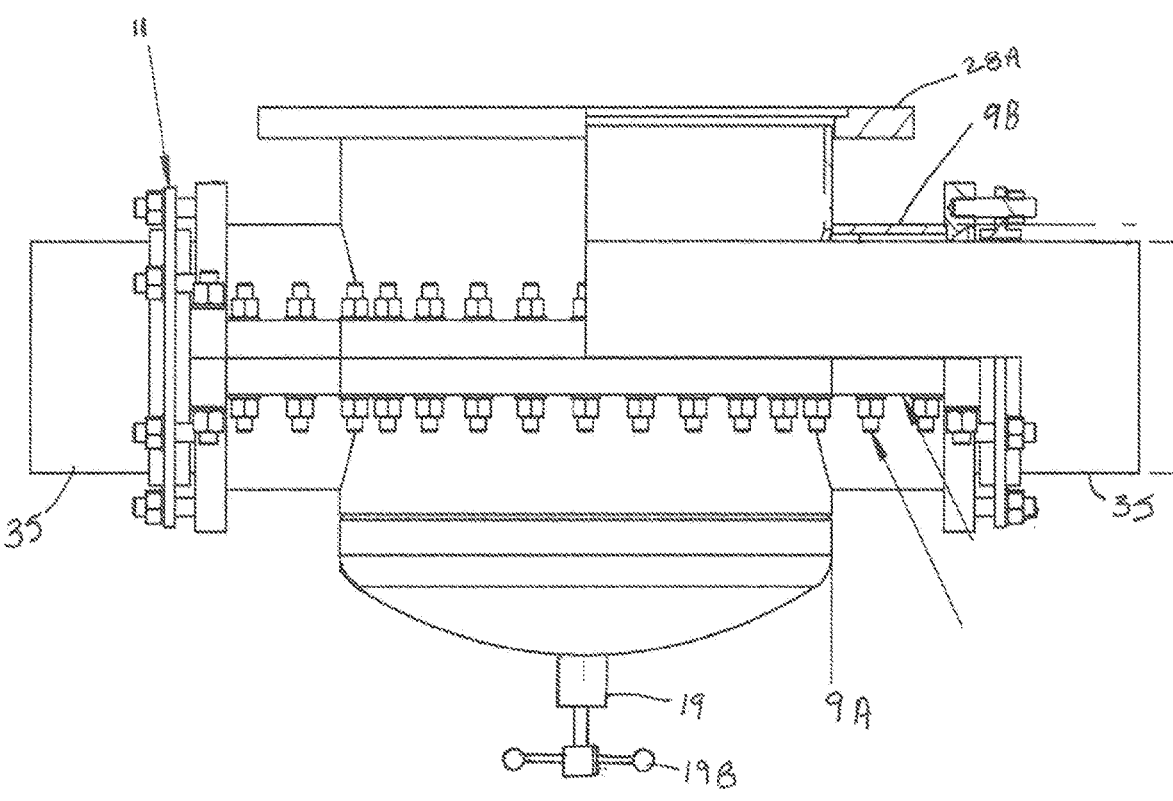

FIG. 32 is a side view of an embodiment of the pressurized housing shown to be assembled onto an existing pipeline. The adjustable support bracket is shown attached to the lower housing.

Figure 33:
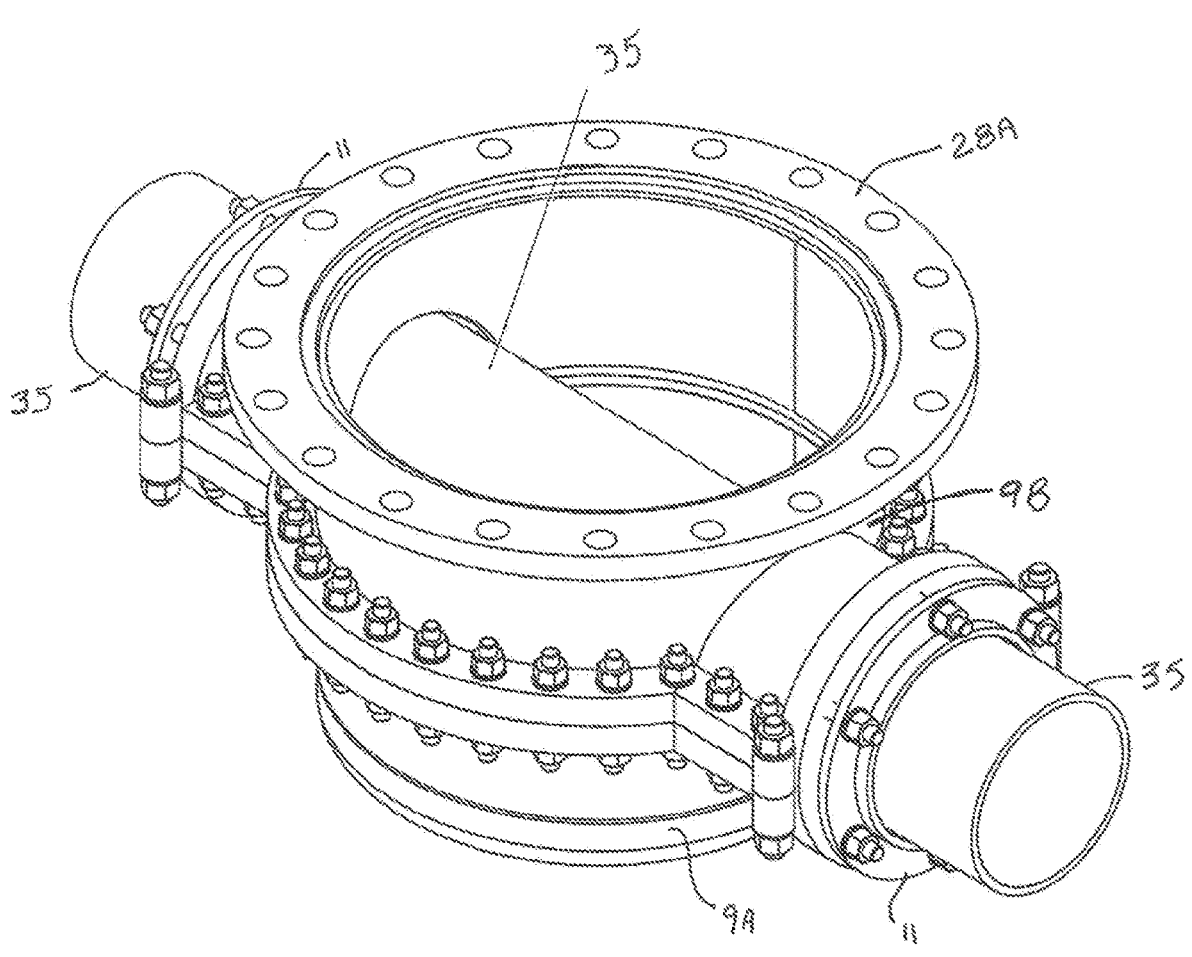

FIG. 33 is a perspective view of an embodiment of the pressurized housing shown to be assembled onto an existing pipeline. This structure is designed to allow a round shaper hole-saw to be housed and perform cutting of the existing pipeline. Separation is performed by the hole-saw passing through two sides of the existing pipeline. The existing pipeline is housed and exposed for removal.

Figure 34:
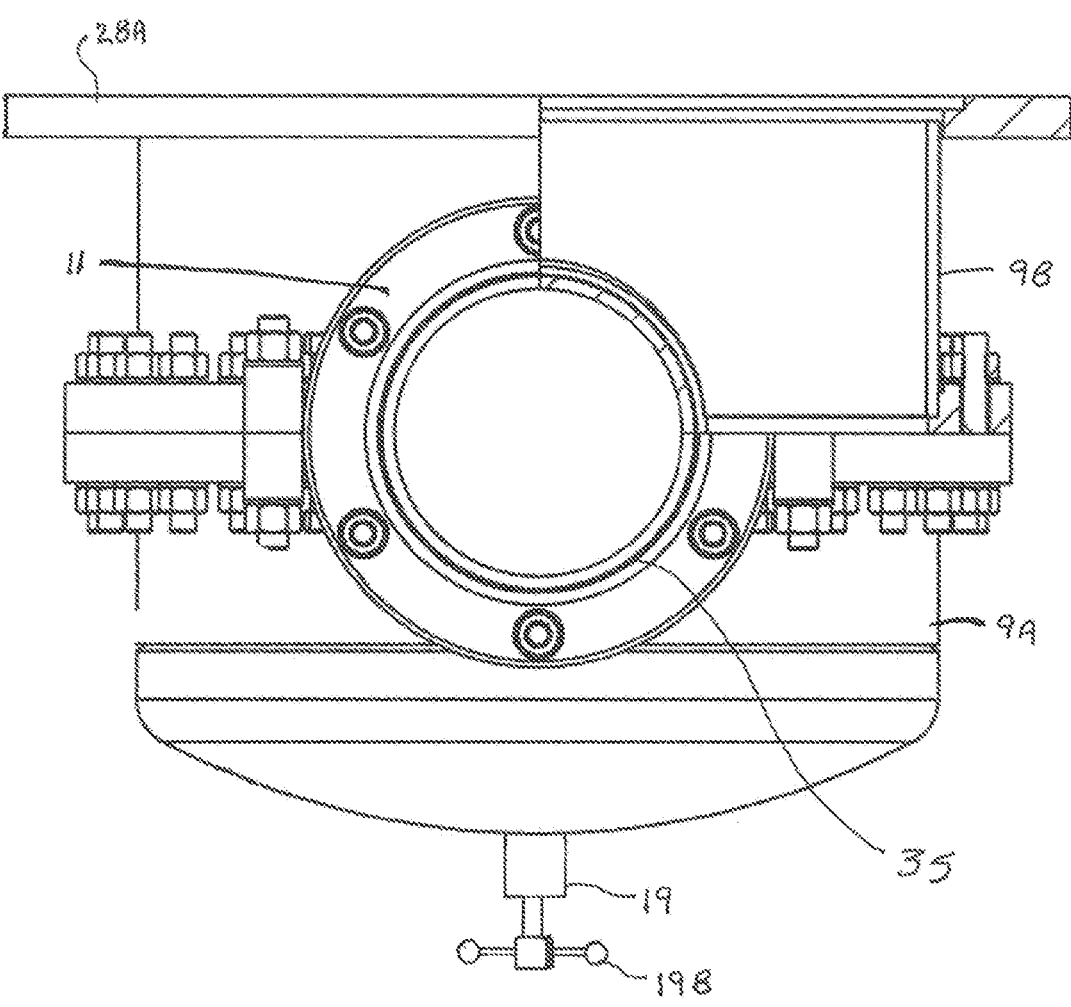

FIG. 34 is a front view of an embodiment of the pressurized housing shown to be assembled onto an existing pipeline. The adjustable support bracket is shown attached to the lower enclosure. Bolts are presented to assemble the housing.

Figure 35:
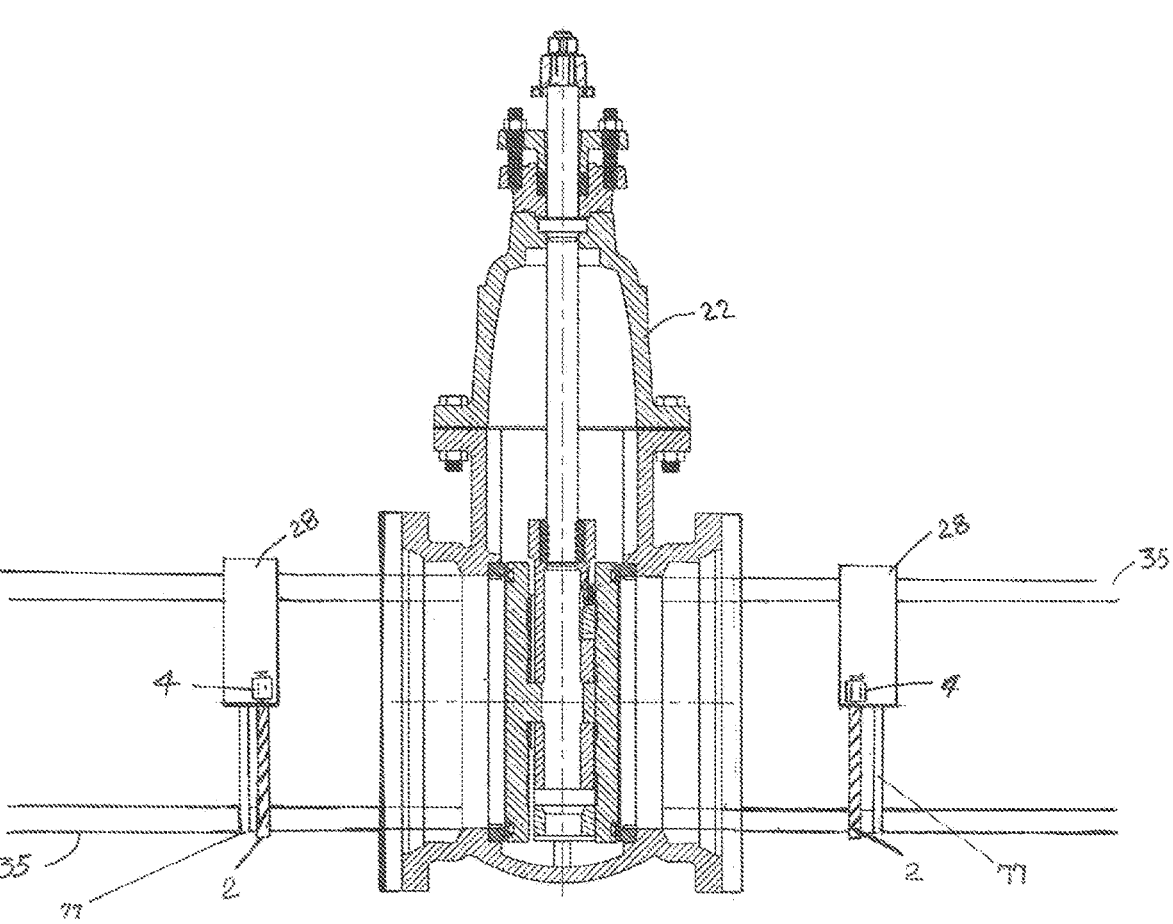

FIG. 35 is a side view of one embodiment of the replacement new valve assembly and one means of temporary installing O.D. Outside Diameter centering collars to the new replacement valve pipe ends. Some sizes of new valve installations may use this wet tapping method to cut and remove a pipe section and expose a gap in the pipe.

The reference numbers in the figures refer to the following:

| Component | Reference Number |
|---|---|
| tension wire | 1 |
| outside restraining clamp | 2 |
| left side restraining clamp | 211 |
| right side restraining clamp | 212 |
| center restraining clamp | 3 |
| bolts (with nuts) | 4 |
| concrete coating | 5 |
| mounting flange | 6 |
| cylinder | 7 |
| pressurized enclosure/housing | 9 |
| pressurized enclosure lower portion | 9A |
| pressurized enclosure upper portion | 9B |
| service valve | 10 |
| mechanical gland | 11 |
| wheels | 12 |
| abrasive belts | 13 |
| stabilizing member | 15 |
| jack screw | 17 |
| internal support bracket of the housing | 19 |
| pipe section | 20 |
| valve withing pipe section | 20A |
| new pipe end assemblies | 21 |
| new valve body | 22 |

-continued

| Component | Reference Number |
|---|---|
| valve body right side | 221 |
| valve body left side | 222 |
| valve body right side cylinder | 223 |
| right side cylinder interior | 2231 |
| right side cylinder opening | 224 |
| valve body left side cylinder | 225 |
| left side cylinder interior | 2251 |
| left side cylinder opening | 226 |
| central chamber | 227 |
| fluid passage | 228 |
| operating nut | 23 |
| first medial edge | 241 |
| second medial edge | 242 |
| seal | 26 |
| seal exterior | 261 |
| seal interior | 262 |
| internal split spring tube | 25 |
| spring tube overlap | 25A |
| tube exterior | 251 |
| tube interior | 252 |
| tube | 255 |
| right side tube | 256 |
| left side tube | 257 |
| cross brace | 27 |
| first cross brace | 271 |
| second cross brace | 272 |
| cross brace medial flange | 275 |
| medial flange upper end | 276 |
| medial flange lower end | 277 |
| O.D. centering collars (Outside Diameter) | 28 |
| mounting surface | 28A |
| gate (isolator) valve | 29 |
| gate valve right side | 291 |
| gate valve left side | 292 |
| gate valve proximal end | 293 |
| gate valve distal end | 294 |
| cutting tool | 30 |
| wet tapping tool | 31 |
| tapping tool hole-saw | 33 |
| bonnet | 32 |
| pipe (pipeline) | 35 |
| left side of the pipe | 351 |
| right side of the pipe | 352 |
| left medial portion of the pipe | 353 |
| right medial portion of the pipe | 354 |
| pipe ends | 36 |
| replacement new valve assembly | 40 |
| standard coupling | 40A |
| sloped tube | 425 |
| sloped surface | 430 |
| sloped surface proximal end | 431 |
| sloped surface distal end | 432 |
| gearbox | 50 |
| shaft | 51 |
| drive unit | 52 |
| cut-covering assembly | 62 |
| right side cut-covering assembly | 621 |
| left side cut-covering assembly | 622 |
| traveling cut-covering tapers | 65 |
| cut-covering return springs | 67 |
| cut-covering return spring, proximal end | 671 |
| cut-covering return spring, distal end | 672 |
| rod | 72 |

-continued

| Component | Reference Number |
|---|---|
| cut gap | 77 |
| receiving cavity | 87 |
| wedged rubber | 88 |
| lower enclosure housing | 9A |
| upper enclosure housing | 9B |
| strong-back | 16 |
| adjustable support bracket | 19A |
| jackscrew adjustment for support bracket | 19B |
| cutter tool retaining member | 30B |

DETAILED DESCRIPTION

The present method uses the natural movement of a gate valve isolator to push or move internal seals by an insertable valve movement into the bores of existing pipe ends. The action of closing the gate valve isolator moves two temporary seals into position on opposite sides of the inserted valve to cover entire gaps created by cutting a pipe to insert a valve.

These seals temporarily cover cuts made in the pipe in fluid-tight arrangement between the new valve ends and the existing pipe ends until permanent external seals can be installed. This process can be used on most known pipe types.

The size, weight and many difficulties that make valve insertions into pipes complex are reduced by this method that set temporary seals inside the pipe sections and allow much smaller permanent fittings to be installed after the enclosure is removed in an open, unpressurized environment. There may be applications where bells and spigots would have to be used and other connections could be imagined. The use of these alternative connections would not take away from the spirit of how the restraining method for PCCP pipe is performed and the how the new sealing techniques presented change the industry.

The new process and product that is installed requires only a very small gap to cover internally. The movement to cover the gap may be short but the movement performs the seal allowing an industry standard gate valve to be installed and not requiring special large non-standard valves to perform this process.

In addition, included is a method of restraining pre-stressed tension wire of known PCCP pipe, and a new way to cut and remove the pipe section and then install a new valve and join the new valve with the exposed pipe ends while the pipeline is fully pressurized. PCCP pipe is manufactured using a thin steel cylinder to provide a fluid-tight membrane and employs a wire wound at high tension around this cylinder that in combination contains the internal pressures used in pipeline systems.

This method provides the installation of new valves into most types of pipelines as well as PCCP pipe. Steel, PVC, ductile iron, copper, stainless, transite A/C and cast iron pipe can all utilize this method to insert a new valve. These other types of pipes are manufactured from a single material so these will not require the restraining methods and as described in detail to allow the safe stripping of concrete or wire in order to expose a work area of the smooth pipe cylinder.

For PCCP the center clamp is used to retain the center section for cutting and on other pipe types enables lifting out the cut section into the bonnet as shown, but permanent restrainers will not need to be left in place on pipe that is not PCCP. The process for PCCP pipe and single wall pipe types can be performed in the same way other than with respect to restraining the concrete and wire on PCCP pipe to expose work areas of the smooth cylinder. A smooth cylinder surface exists on other pipe types without the restraining process.

PCCP pipe has been installed for many years and as the old control valves wear out, new isolation valves are needed, and if a change or repair is required on a system new valves are required to be isolated. The thin steel cylinder used in PCCP cannot contain the working pressures of the pipeline without the supporting tension wire remaining in place. A process and system for removing the wire to insert a gate valve has not been previously known.

The tension wire is covered and embedded in the concrete coating to hold the wire in place and protect the wire from damage and corrosion. Wire is wound at high tension around the outside diameter of the steel cylinder to increase the pressure rating. On PCCP pipe if the tension wire is cut or damaged it will unwind from the cylinder, causing the pipe to lose its strength. The present invention allows the wire to be restrained and cut without concern that the wire will unwind from the cylinder. This system also provides the capability for at least one of the restraints to be removed with a pipe section and that center restraint replaced with a valve while the pipeline is fully pressurized without risk of the wire unwinding from the steel cylinder.

PCCP pipe is composed of a round carbon steel cylinder with wire wound around it and provides concrete lining and concrete coating. This configuration of different materials makes installing known types of insertion systems not possible for PCCP pipe. Bolting an insert body to the PCCP concrete coating would not result in a fluid-tight seal, and if you removed the concrete to expose the wires there would not be a smooth surface to permanently seal as the surface is uneven due to the wire being wrapped around this cylinder. In addition, removing the tension wire from the PCCP cylinder in a long area for a valve body to be installed is not possible without risking the integrity of the pipe.

The present method was developed to include restraint of PCCP tension wire along various locations of the pipe and expose short smooth work areas of the PCCP pipe cylinder where permanent and temporary fittings can be installed and removed. The method involves restraining a section of pipe by use of a center restraining clamp to support the area, removing a section of pipe, and making an area to insert a valve with pipe ends installed and seals that can be simply inserted internally so less wire can be removed from the host pipe's structure.

On PCCP pipe this process provides for at least two outside restraining clamps that are mechanically installed onto the pipe coating to permanently retain the coating's internal tension wires. In addition, at least one temporary center restraining clamp that surrounds the concrete coating is used to retain the wire, and once the pipe is cut this center clamp(s) becomes sacrificial and removed with the cut section of pipe. This installation of clamps provides at least two locations where a smooth steel cylinder can be safely exposed to mount a temporary enclosure. Being able to remove the center clamp under pressure with the severed pipe provides a method that supports the pipe when needed, and is removed with the clamp under pressure making room for a new valve once the restraint of the pipe is no longer needed.

By providing at least three restraining clamps that encircle the concrete coating as shown in this method, the tension wire is held in place so valve Inserting can be performed on a fully pressurized PCCP pipeline.

This process provides various restraining mechanism(s) or "clamp(s)" to hold wires in place by securing the concrete that holds the embedded wire. The term "clamp" will be understood to refer to one clamp or to multiple clamps used in combination that are meant to encircle a pipeline's concrete coating holding it in tension, to retain the wire in place. The clamps can be tightened around the concrete coating, enabling the clamps to tightly hold the concrete and embedded wire in position.

To begin the restraining process, at least three clamps are used to prepare the pipe for inserting a valve. The center restraining clamp is almost as wide as the intended cut section of pipe and this center clamp's main function is to support and retain a section of pipe by holding the wire within the pipe coating until the pipe section is cut and the center-clamp is removed with the pipe section under pressure and discarded. In addition to the center clamp there is at least one outside clamp installed on each side of the center clamp to permanently retain the concrete and wire that support the pipe from internal pressure.

On PCCP pipe, space is provided between the center clamp and each outside clamp to allow the removal of concrete and wire to expose the smooth steel cylinder on each side of the center clamp. This area of exposed smooth PCCP cylinder allows the installation of a pressure holding container or "enclosure" that can be installed onto the cylinder in a short area.

The exposed smooth areas need to be kept as short as possible. On some applications it may be necessary to obtain additional short clear working areas by using additional clamps to remove more than two areas of concrete and wire to expose more smooth work areas. If required, at least a second set of outside clamps can be installed a short distance away on the outside of the initial outside clamps to retain the concrete and wires.

This second set of clamps would be a short distance away and additional clamps can be installed outside of the initial outside clamps to gain additional work areas. This process can provide additional access locations of the smooth cylinder so enclosure glands and work locations can be installed in separate areas along the cylinder's exterior.

The enclosure attached to the pipe cylinder has a means of accepting a service valve to be mounted on top and act as a fluid isolator for a bonnet so tooling can be installed and removed to complete the new insert valve installation while the pipeline remains pressurized. Bonnets for use with the present system and method are known to the art, and are described for example in U.S. Pat. Nos. 6,983,759, 6,776, 184, 7,021,325, and 7,021,325. A temporary pressure-tight enclosure is installed onto the host pipe in fluid-tight arrangement and seals on the pipe wall and on PCCP seals in the short areas of smooth cylinder provided. The pressure-tight enclosure is split into at least two halves so each end of the container can be assembled onto the existing pipeline by use of split mechanical draw glands that force a split tapered wedge-style rubber gasket into a receiving area for the wedged rubber on the enclosure to make the fluid-tight seal.

The pressure-tight enclosure is built to encompass the center clamp and the intended pipe. The enclosure provides a support for a service valve that allows various functions to complete the valve insertion.

In addition, the bonnet of the present system is designed to be large enough to house a stabilizing member and cutting mechanism and provide enough room to receive the cut section of the pipe and center clamp with the cutting mechanism and the stabilizing member all at one time if desired. Initially, the bonnet housing with the stabilizing member and the cutting mechanism is held above the service valve. The stabilizing member is extended to reach the center clamp and both are secured together in rigid fashion by bolting or threading. Once the stabilizing member is secured with the center clamp, the bonnet housing can be lowered with the cutting mechanism using the stabilizing mechanism and secured to the open service valve in fluid-tight arrangement. Once secured to the open service valve the cutting mechanism can be lowered into position by known advancing mechanisms such as a screw jack and a packing seal to keep fluid from passing from the bonnet. With the stabilizing member attached to the center clamp the intended pipe to be cut is held in rigid position. The enclosure has pipe supports that can be advanced or tightened against the exposed cylinder or center clamp that will help hold the pipe section to be cut in a rigid manner. The cutting mechanism will begin cutting the crown of the pipe and pass through the entire pipe section.

The cutting mechanism can use various known methods such as wet tapping, where a round cutter is used to cut out a whole section of pipe using a hole saw. A drawing of an alternative method known as hot tapping is included in FIGS. 26, 27, 28, and 29 of the drawings. Known hot tapping methods may use a pilot drill or retaining a device to hold the cut section to be removed.

A flexible cutting belt that can include cables, wires or have flexible chains similar to a chain saw. Diamonds or known hard particles are attached to perform cutting or abrasive separation of the pipe. The cutting mechanism can cut two paths simultaneously but in some applications only one cut may be performed at a time. The flexible cutting tool provides at least one drive wheel for each flexible belt and one or more wheels to keep the flexible belt tight and movable. The motor to drive the flexible belts can incorporate a direct drive that uses at least one rod or driveline that can pass through the bonnet to one or more gearboxes. This rotational movement will drive the wheels to power the belts so a motor can be provided outside of the pressurized container.

As the cutting penetrates the pipe wall the enclosure becomes fully pressurized by the pipes contents as the fluid enters the enclosure. The enclosure provides a housing that contains the fluid pressure, so equal pressure will exist on the outside of the pipe as well as the inside of the pipe, this allows the center clamp to become sacrificial as the pipe section requires no more restraint of the tension wire at this center location once equal pressure is achieved.

Once the pipe section is completely separated, the stabilizing member or tapping machine is operated to retract and remove the cut section of pipe or the center restraining clamp. The cutting mechanism can be fully retracted into the bonnet housing with the stabilizing member so the service valve can be closed. Closing the service valve allows the depressurization of the bonnet and removal of the bonnet from the service valve with all the enclosed items. The cut section of pipe, the center restraining clamp, the pilot drill or retaining device is removed from the stabilizing member or hole saw and the cutting mechanism is removed from the bonnet housing.

A new valve to be inserted into the pressurized system is positioned and securely attached to the stabilizing member and moved into the housing of the bonnet. The insertion valve can be preferably set in the open or semi open position prior to inserting into the pipeline. Cut-covering assemblies are installed fully into both pipe ends one on each side of the new valve. The bonnet is reinstalled onto the service valve in fluid-tight arrangement and the bonnet becomes pressurized by opening the service valve to allow fluid to pass into the bonnet. Once the service valve is fully opened the stabilizing member securing the new valve with pipe ends holding cut-covering assemblies is extended into the fully installed and secure position within the gap left by the removed pipe section. A half diameter top collar provided with various desired shapes can be attached to both new valve pipe ends matching the existing pipe outside diameter, ensuring that the installation accurately lines up the new valve bores with the existing pipe bores for the internal seal passage. The new valve pipe ends may take on a contoured shape to match the existing pipe ends' contoured shape left when cut with a hole-saw. The collars may take on this contoured shape as well and still overhang to provide accurate alignment.

The cut-covering seals are wider than the gap made in the pipe by the cutting tool. The cut-covering seal may incorporate designs that help seal the gap created by the pipe being cut. The seal design could include angles, pockets, or any number of imaginable different designs to make up a seal that holds the seal in its desired position, and that covers and plugs the cut or gap in a fluid-tight and structurally sound arrangement.

A spring producing cylinder may be used to create outward pressure on the seal to keep the seal riding on the inside diameter of the pipe walls, the cylinder keeps the fluid pressure from the pipeline from extruding the seal through the cut and holds the new valve in position once the service enclosure is removed. Many types of materials and shapes can be used, but preferably steel or stainless steel, plastics and composites, made from solid tubes to split rolled tubes that overlap under tension can be used to create a round shape that matches the diameter needed and provides an outward pushing force. The round shape can provide an overlap that gives the desired expansion needed to add spring to the cylinder. A solid, non-split or springing tube made of various materials is described in detail and shown in FIG. 20.

Together this cut-covering assembly can provide a spring-loaded sealing member that supports the valve installation once moved into position with the existing pipe ends. The cut-covering assembly is hollow in shape and looks similar to a piston-inserting tool that is used to compress piston rings prior to sliding the piston into an engine bore.

The cut-covering assembly initially is installed into both pipe ends of the new valve. When moved partially into the existing pipe ends the cut-covering assembly will cover the entire cut made around the internal diameter of the pipe. The cut-covering assembly can end up preferably half in the new valve ends and half in the existing pipe to cover the gap in order to make a fluid-tight seal. But it is not necessary that half the cut-covering assembly be halfway into the existing pipe to perform the seal.

One embodiment provides one or more cross braces used with the cut-covering assemblies to abut and move with the gate of the valve so that when the gate isolator is closed, the gate can be in direct contact with the cross braces, or can be in contact with intermediate members that contact the cut-covering assembly. Cross braces can be installed at an angle or can include wedge shaped configurations on the cut-covering assemblies that cause pushing of opposing cut-covering assemblies toward the existing pipe bores when the gate is activated toward the closed position. By use of one or more springs attached to the cut-covering assemblies, the wedge shaped configurations can retract back into position if the gate pressure is removed and reversed. When the gate valve operator is rotated preferably toward the closed direction, movement similar to a jackscrew is provided by means of a round rod that passes through the bonnet of the service valve. A packing seal is provided on the bonnet around the operational rod to keep fluid from passing out of the bonnet and by rotating the new valve's operator toward the closed position, the gate movement pushes both cut-covering assemblies into both existing bores of the cut pipe. By the gate traveling along an angled cut-covering assembly surface, the linear movement of the gate moves the cut-covering assemblies away from the gate and into a sealing position to cover the gap between the new valve pipe ends and the existing pipes. In one embodiment, the travel of the gate pushes against at least one tapered cross brace or intermediate members forcing the cut-covering assembly to slide into the existing pipe bore to a predetermined location within the existing pipe ends. Many methods of moving the cut-covering assembly can be imagined but this is a simple method which achieves this requirement.

With the new valve pipe ends in line with the existing cut pipe ends, the valve's gate is preferably moved toward the closed position, forcing the isolator to engage with the cross braces of the cut-covering assemblies installed on each side of the gate. Upon continuing closing of the gate, the gate slides across the cut-covering assemblies and by their wedged shape the gate forces the cut-covering assemblies from their position within the new valve pipe ends, partially into the existing pipe ends to cover the gap that is remaining from cutting the pipe. Both cut-covering assemblies are pushed and slide in the same manner in opposite directions at the same time from the new valves pipe ends into the existing pipes cut ends. A portion of the cut-covering assembly stays within the new valve's pipe ends and a portion moves into the existing pipe where the gap remaining from cutting the pipe is covered. The depressurization of the service housing sets the seals in fluid-tight arrangement. The outward springing action of the tube can help provide even movement by keeping the cut-covering assemblies pressed against the inside diameter of the new valve ends and during traveling against the existing pipe wall, though a solid tube without a springing effect may be used in various applications. This movement places the seals in position to cover the gap for the depressurization of the service housing. Once the service housing is depressurized, the cut-covering assemblies seal the new valve tightly into position with the existing pipe ends. If needed, the operation of the new valve can be reversed by opening it and by using one or more springs installed with the cut-covering assembly to retract the cut-covering assemblies back into its pre-activated position.

Attached and overlapping halfmoon collars matching the existing pipe's outside diameter are installed on the top of each new valve's pipe end. These collars allows accurate alignment up and down and side to side, and when the new valve is set into the cut section of the pipe under tension the centering collars mate with the O.D. (outside diameter) of the existing pipe, and the centering collars create a true alignment when jacked into position tightly between the new valve and the cut pipe sections. Once the new valve is in position with the existing pipe and the cut-covering assemblies have been advanced into the existing pipe bore covering the gap, the pressurized enclosure housing used for the insertion process can be depressurized. Once depressurization is performed the internal pressure from the existing pipeline will cause the cut-covering seals to press tight against the inner walls, securing the seals in fluid tight manner, and the tube or spring tube will temporarily retain the new valve in position. The rigid spring tube will keep the seal from extruding through the cut gap and restrain the new valve in position until conventional pipe-joining couplings can be placed around the exterior of the gap sections to securely cover the cut area as a permanent completion to the valve installation. The pressurized enclosure can be removed or semi removed at this point (see FIGS. 26, 27, 30, and 31).

Figure 1:
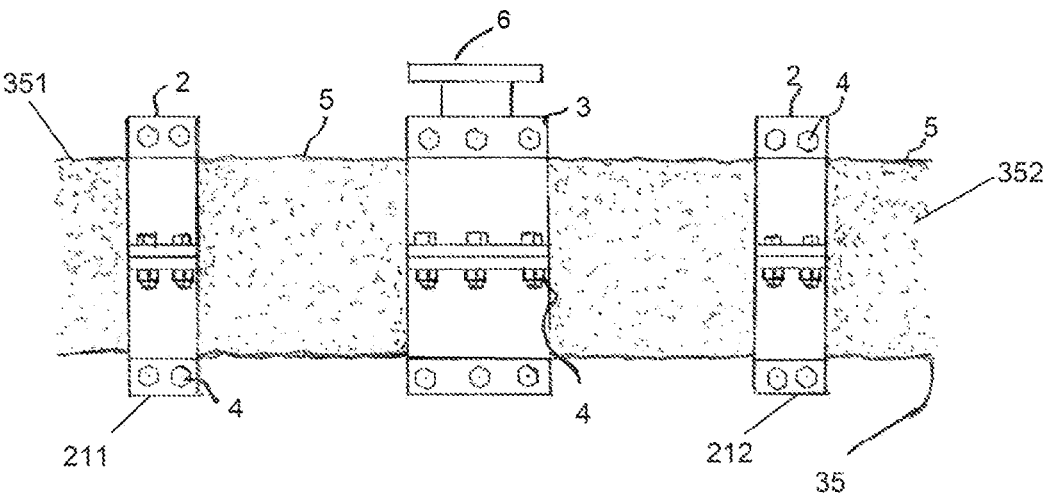
FIG. 1 is a side elevation view of existing pipeline with three restraining clamps attached, a first outside-restraining clamp, a center restraining clamp with a mounting plate and a second outside-restraining clamp. Once the clamps are installed around the pipeline's concrete exterior, the clamps retain the concrete coating that holds the tensioned wires in place. Only PCCP pipe requires restraining of tension wires to provide a smooth clear cylinder.
Figure 2:
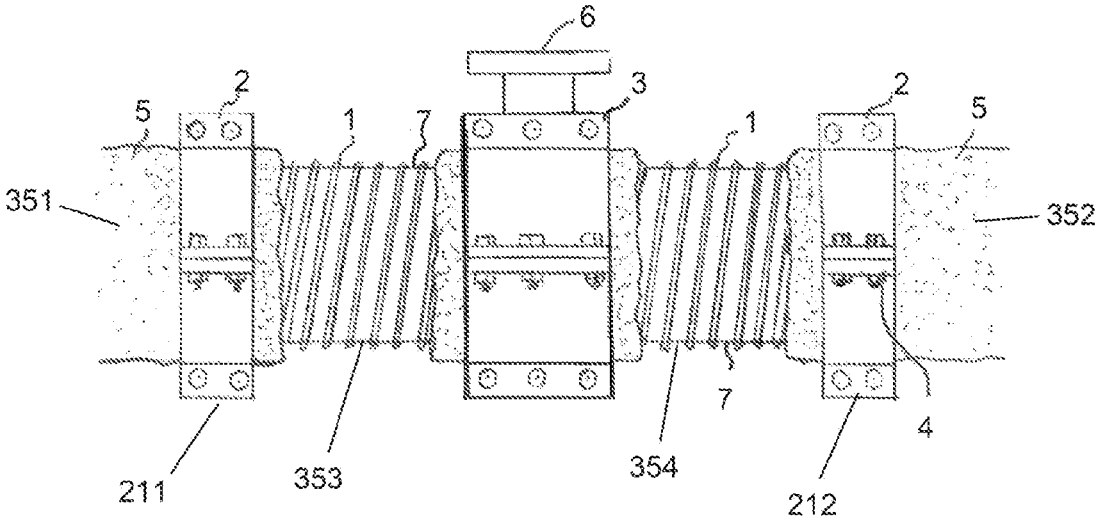
FIG. 2 is a side elevation view that shows existing a PCCP pipeline with three restraining clamps in place. These clamps secure the tension wires by encircling the concrete coating under compression. The concrete coating is removed between the center restraining clamp and outside restraining clamps, exposing the tension wires.
Figure 3:
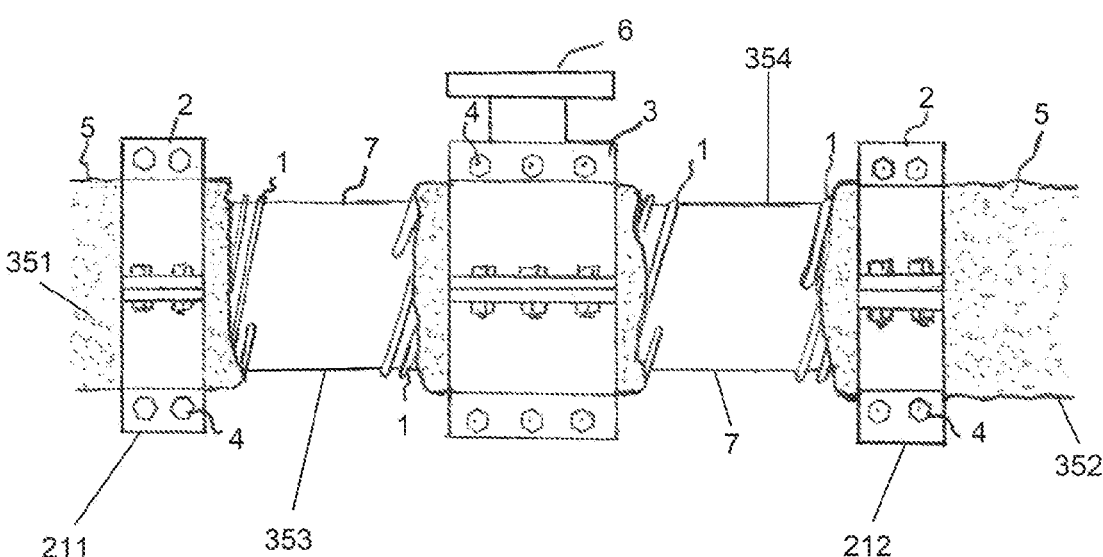
FIG. 3 is a side elevation view of a PCCP pipeline with three restraining clamps installed. The tension wires between the clamps are safely removed, exposing the smooth steel cylinder to provide safe areas where work can be performed. The tension wires are removed between the center restraining clamp and the outside restraining clamps, exposing smooth steel cylinder in two locations where work can be performed.

As seen in FIGS. 1-3, a known way of restraining tension wires and removal of a pipe section is repeated to aid in presenting this invention.

Tension wires 1 are embedded within the concrete coating 5 of a PCCP pipe 35. Restraining clamps 2 remain permanently a part of the pipeline 35 to the keep the wire 1 in tension around cylinder 7 to secure the strength of pipeline 35. Center restraining clamp 3 is temporary and is installed a short distance away from outside clamps 2 to provide smooth areas of cylinder 7 free of wire 1 and concrete 5 without risking the loss of pipe 35 strength. Clamps can be formed from a combination of pieces joined for example by bolts 4, as shown in the illustrated embodiments. Restraining clamps 2 and 3 are designed to hold the various sizes of pipelines 35 and accommodate internal working pressures. A mortar mix can be applied to make up for out-of-round surfaces of concrete 5.

The center restraining clamp 3 can be made up of a combination of pieces to make one clamp or a combination of clamps with multiple pieces as seen in FIG. 1 to make up the center restraining clamp 3. The center clamp 3 is provided with a mounting flange 6 that is intended to mate with stabilizing member 15 shown in FIGS. 7, 8, and 9. The stabilizing member 15 preferably attaches to mounting flange 6 by common threading or bolting. Threading is preferred because it is a stabilizing member that can allow attachment and detachment (screwing and unscrewing) under pressure. The center restraining clamp 3 is installed around pipeline 35 encircling its concrete coating 5 to secure the tension wires 1 that support cylinder 7.

Clamps 2, 3 are preferably assembled by bolting 4, and the outside clamps 2 are installed a predetermined distance and outside of center-clamp 3. The outside-restraining clamps 2 can consist of a single clamp or a combination of clamps to make up the outside-restraining clamp 2. Bolts and nuts 4 are used to assemble restraining clamps 2,3. These outside restraining clamps 2 can remain as a permanent part of the pipeline 35. Multiple outside restraining clamps can be used and left in place to provide additional service locations along the steel cylinder 7 for tooling or services. For example, as seen in FIG. 17 a second left side restraining clamp 2A placed to the left of the left side restraining clamp 211 and a second right side restraining clamp 2B placed to the right of the right side restraining clamp 212 can be attached to the pipe 35.

The center restraining clamp 3 seen in FIGS. 1-4 may have a smaller width than new valve 22 with its subassemblies 21 to allow the cutting tool to pass. The center restraining clamp 3 is removed from its position with pipe section 20 as seen in FIG. 9. When the section 20 is cut by the cutting tool 30 (see FIGS. 5, 7) this removing section 20 includes removal of the center restraining clamp 3 as shown in FIG. 9 while the pipeline 35 is fully pressurized. Enclosure 9 allows equal pressure inside and outside of pipeline 35 so this removal of cut section 20 can be performed. The removal of the center restraining clamp 3 with cut section 20 could not take place without an equal pressure condition of pipeline 35. Once the wire 1 is cut to expose the smooth cylinder 7 and clamp 3 is removed, the wire 1 would separate from cylinder 7 and the unsupported cylinder 7 would run the risk of rupturing after wire 1 is removed.

Using the present method, by encapsulating the center restraining clamp 3 with enclosure 9 to provide exterior pressurization of pipeline 35 with the same pressure as the inside of pipeline 35, no stress exists from internal pressure on cylinder 7. This allows cutting and removing center restraining clamp 3 with the pipe section 20 from pipeline 35 to be safely performed. In addition, equal pressure produced by enclosure 9 allows the cut-covering assemblies 62 to be inserted smoothly with very little resistance and without fluid pressure escaping through cut gap 77. Unequal pressure would affect the movement of the cut-covering assemblies 62 into pipe ends 36.

Figure 4:
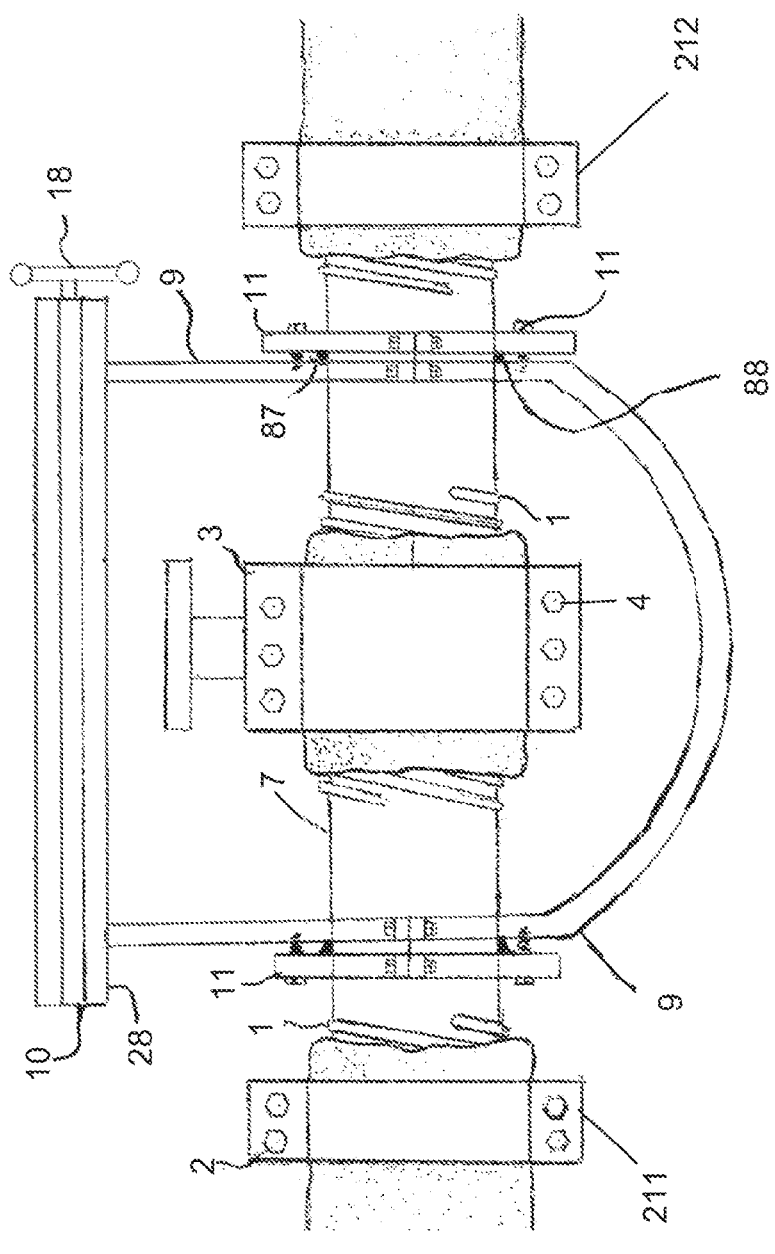
FIG. 4 is a sectional side elevation view of a PCCP pipeline with three restraining clamps installed around the concrete coating to secure the tension wires, allowing areas of the steel cylinder to be exposed. The center clamp has a mounting attachment for the stabilizing member to connect. A pressure enclosure housing is mechanically installed on the existing pipeline. Using an enclosure with more than one part allows installation of this enclosure in fluid-tight arrangement onto a pressurized pipeline. The enclosure provides the means of attaching a service valve on top. This service valve allows various operations that are required to perform the insertion valve process.

FIG. 4 shows pressurized enclosure 9 assembled onto the pipeline 35 using mechanical seal or gland 11 that by bolting pushes and compresses a wedged rubber (elastomeric) gasket 88 into a receiving cavity 87 on opposite sides of enclosure 9. The gasket 88 surrounds the pipe and is preferably cut at a tapered angle to form a wedge and wrapped around the pipe in cavity 87 so that when the ring member 11 is tightened it seals the cut rubber edges by compression all the way around the pipe to form a mechanical joint. This multi-piece enclosure 9 is installed on a clear area of a cylinder 7 or on a smooth pipe 35.

Enclosure 9 has a mounting surface 28A where a service valve 10 connects so that a bonnet 32 can be installed and removed to perform various services. Attached to bonnet 32 is a stabilizing member 15 that can be retracted and advanced to restrain clamp 3 by mounting flange 6. Clamp 3 is attached to pipe section 20 to retain the pipe section in position for cutting. Abrasive belts 13 which rotate on the cutting tool 30 can be used, as shown in FIGS. 5 and 6.

Figure 5:
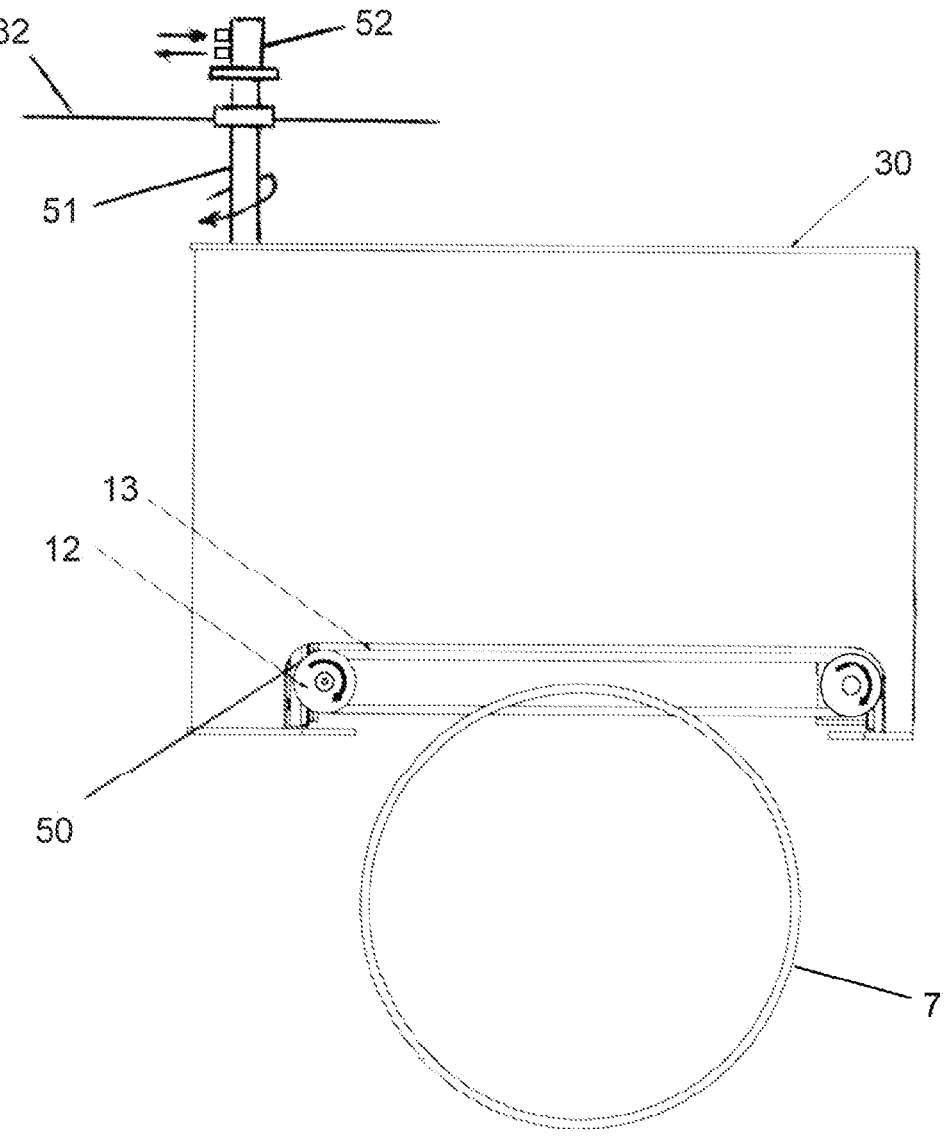
FIG. 5 is a side elevation view that shows the cutting mechanism that uses at least one drive wheel and one support wheel to move a flexible belt. The belt incorporates attached diamonds, carbides or other abrasive media to wear through pipelines such as PCCP that are concrete, or the belt can include cutting edges that are sharp to perform cutting for pipes such as plastic and iron. In one embodiment the belt can include edges similar to a chain saw. In a preferred method the mechanism has at least two cutting belts with at least two drive wheels to sever the pipe section with one movement. Some pipelines may require one cut to be performed at a time. This figure shows a gearbox that is driven by a shaft which extends outside of the bonnet so that a power unit can be used to turn the belts.

FIG. 5. is a known style cutting tool 30 with at least one gearbox 50 can be provided that can be powered by a shaft 51 that passes through the housing 9 or bonnet 32 to connect to a drive unit 52 so the belts 13 can move to cut the pipeline 35. Using an external drive 52 can allow a hydraulic or electric drive 52 without being under water or pressurized within the housing 9. The provided wheels 12 keep the belt 13 tight and drive the belt to perform cutting of a section of pipe 20 from pipeline 35 shown in FIG. 9.

Figure 6:
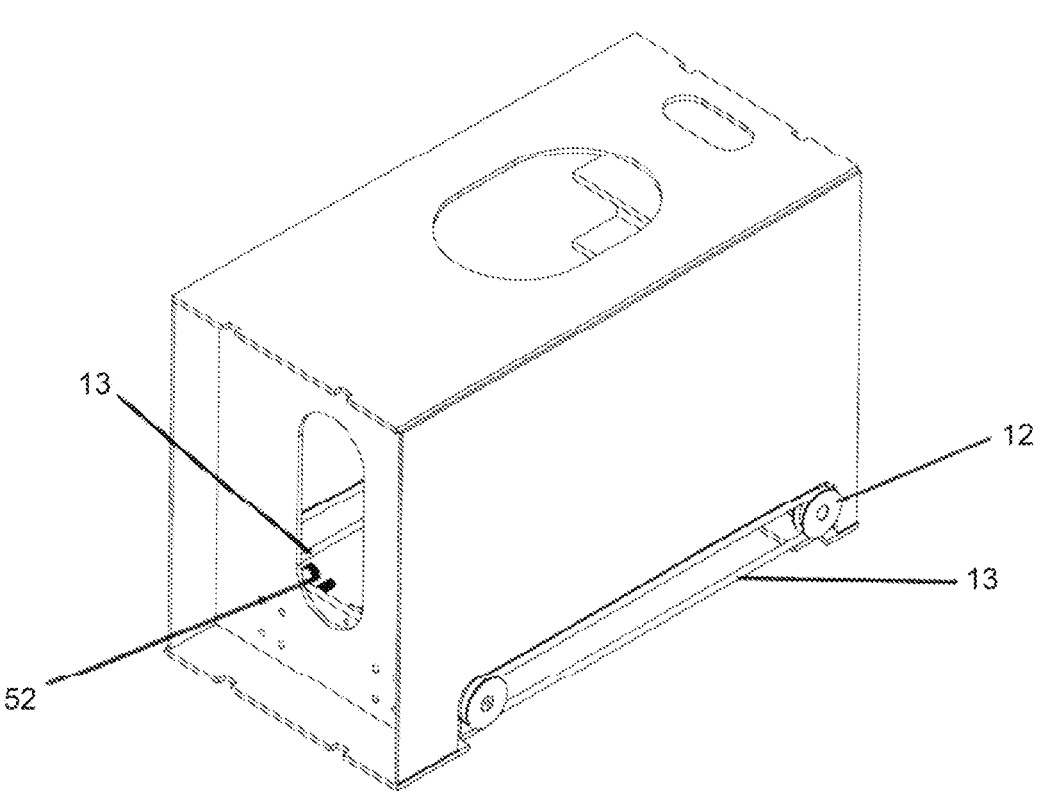
FIG. 6 is a perspective view depicting a gear box that turns drive wheels that power the movement of the belt to cut the pipe. A number of existing products using flexible cables and wire that cuts material can be used. This illustration shows how the cutting assembly can be arranged and used to turn two flexible belts. The belts are used to make perpendicular cuts through the pipe section so a section of pipe can be cut and removed from a pipeline after a section of pipe is severed.

FIG. 6 is a top view of a known cutting tool 30. Showing both locations of abrasive belts 13 turned by wheels 12 and drive is provided by shaft 52.

In FIG. 7, an advancing jack screw 17 moves cutter 30 downward from bonnet 32 into housing 9. The advancement of cutter 30 is shown by arrow and tool 30 is moving toward pipeline 35.

In FIG. 8, cutter 30 is shown cutting pipeline 35 to create a cut section 20 shown in FIG. 9. The advancement of cutter 30 is shown by an arrow while tool 30 is rotating abrasive cutting belts 13 and separates a section of pipeline 35.

In FIG. 9, cut section 20 being attached to clamp 3 and remaining within cutting tool 30 is retracted by member 15 into the bonnet 32. Once retracted, service valve 10 can be closed to isolate pressure found in existing pipeline 35 and housing 9. The tool 30 and cut section 20 are retracted back into bonnet 32 so the bonnet 32 can be removed from service valve 10. Receiving cut gap 77 is created and shown in pipeline 35 that exposes existing pipe ends 36.

FIG. 10 depicts a new valve 22 with pipe ends 21 attached and both pipe ends 21 include cut-covering assemblies 62 shown in FIGS. 14, 15, and 16. O.D. (outside diameter) centering collars 28 are attached to each new valve pipe end 21 to provide accurate alignment with existing pipe end's 36 outside diameter. Cut-covering assemblies 62 are placed within each pipe end 21 and attached to new valve body 22 to make up replacement new valve assembly 40, being secured to stabilizing member 15 and retracted into bonnet 32 so service bonnet 32 can be bolted to service isolation valve 10. Once bonnet 32 is secured to service valve 10, service valve 10 can be fully opened to pressurize bonnet 32 allowing replacement new valve assembly 40 that includes pipe end assemblies 21 to be installed by advancing stabilizing member 15 into cut gap 77 from where pipe section 20 was cut and removed from the existing pipeline 35 creating existing open pipe ends 36 as seen on each side of cut gap 77 and as also seen in FIGS. 9 and 10.

In FIG. 11, the replacement new valve assembly 40 including attached pipe ends 21 containing cut-covering assemblies 62 seen in FIG. 12A are shown to be set in alignment with existing pipe ends 36 by use of O.D. (outside diameter) centering collars 28. Replacement new valve assembly 40 is moved into position by stabilizing member 15. The O.D. centering collars 28 provide a half circle that is connected to each pipe end 21 and designed to overlap to cover existing pipeline 35. O.D. (outside diameter). Centering collars 28 have the same inside diameter as existing pipe 35 outside diameter and encompass preferably half the pipe, (from top of pipe to springline on each side of pipe) when replacement new valve assembly 40 is torqued or pressed into position. This procedure is designed to cradle and accurately align the replacement new valve assembly 40 in accurate placement by insertion by stabilizing member 15. This procedure installs the replacement new valve assembly 40 in a tight and accurate fashion. O.D. centering collars move replacement new valve assembly 40 into true alignment to enable both attached pipe end 21 bores and the existing pipe ends 36 bores to match. The inside diameters of pipes 21 and existing pipe ends 36 are placed in alignment and in the same plane with one another. This allows the cut-covering assembly 62 seen in FIG. 13A to easily slide through all bores of the pipe ends without restriction and cover gap 77.

FIG. 12 presents the replacement new valve assembly 40 set within existing gap 77 made by cutting tool 30. Cut-covering assemblies 62 are arranged to travel into existing pipe ends 36 shown. After replacement, new valve assembly 40 with sub-assemblies 21 are in position, and new valve 22 can be operated within pressurized enclosure 9 by rotating control rod 72, seen in FIG. 12A, to close the new gate valve 22 isolator 29 as also seen in FIGS. 11, 12A and 13. Operating control rod 72 in the closing direction by its turning of operating nut 23 of valve 22 as shown by and arrow, also seen in FIG. 13. This rotation advances gate 29 toward a closing direction.

Each of the pipe ends 21 of replacement new valve assembly 40 includes a cut-covering assembly 62, and various movement components can be imagined that use a taper or mechanical means to advance the cut-covering assembly 62 by the linear force created by closure strength of gate 29.

FIG. 12A shows gate 29 being closed by rotating actuation nut 23. When the valve 29 is moved between a first position and a second position (vertically downward in the illustrated embodiments), a distal end 294 of the valve 29 contacts a relatively proximal (upper) end 431 of the sloped surface 430 on each side of the valve assembly 40. As the valve 29 continues moving, the valve contacts more distal surfaces 432 of the sloped surfaces 430 and exerts pressure (downwardly and outwardly in the illustrated embodiments). As the right side 291 of the valve contacts the sloped surface 430 of the right side tube 256, it urges a right side end of the right side cut-covering assembly out of the right side cylindrical opening 224, and simultaneously as the left side 292 of the valve contacts the sloped surface 430 of the left side tube, it urges a left side end of the left side cut-covering assembly out of the left side cylindrical opening 226. The gate moves in a linear fashion in direct contact with traveling cut-covering tapers 65, i.e., the sloped surfaces 430 of the cut-covering assembly 62, to force cut-covering assemblies 62 away from gate 29 on both sides and move the cut-covering assemblies 62 from their secured placement within pipes 21 into pipe ends 36.

In FIG. 13, cut-covering assembly 62 is moved mechanically by rotating rod 72 through bonnet 32. This rotating movement of valve 22 operating nut 23 installs both cut-covering assembly 62 into existing opposing pipe ends 36 to cover remaining gaps 77. At that point new valve 22 and its gate 29 are now preferably in a semi-closed to closed position. The cut-covering assembly 62 can stay in position due to tension created by the split or spring tube 25 and seal 26 until service enclosure 9 can be depressurized. Cut-covering assembly 62 is installed partially into the existing pipe ends 36 to a point which is at least enough to cover cut gap 77 as seen in FIGS. 13, 14, and 16.

If desired, at least one cut-covering return spring 67 shown in FIG. 13 can be used to perform retraction of the cut-covering assembly 62. In this embodiment, a proximal end 671 of a return spring 67 is attached or otherwise mechanically connected to an inner portion of the cut-covering assembly (adjacent the central chamber 227), such as to the tube or conduit of the cut-covering assembly, and a distal end 672 of the return spring is attached or otherwise mechanically connected to the housing of the valve assembly, such as in the central chamber 227.

FIG. 14 shows an embodiment in which the right side cut-covering assembly 621 is positioned in an interior 2251 of right side cylinder 223 and a left side cut-covering assembly 622 is positioned in an interior 2231 of the left side cylinder 226. Each cut-covering assembly can include an elastomeric seal 26, a tube 255, which may be a split or spring tube 25, and may include cross brace(s) 27 if needed seen in FIG. 17. The exterior surface 261 of the elastomeric seal 26 contacts an interior surface of the cylinder of the replacement new valve assembly 40, and an exterior surface 251 of the tube 255 contacts an interior surface 262 of the elastomeric seal 26. A spring tube 25 can be used to exert pressure (force) outwardly, i.e., on the interior surface 262 of the elastomeric seal 26, which assists in creating a fluid tight seal with the seal 26. The tube 255 or spring tube 25 may be installed against the internal pipe ends 21 or the seal may be installed against the pipe ends 21 both arrangements can be used.

One or more cross braces 27 may extend within the fluid passage 228 of the replacement new valve assembly 40 in the central portion of the cut-covering assembly 621, extending between a first position 2251 on the interior surface of the spring tube and a second position 2231 on the interior surface of the spring tube 25. The wedge shape of the spring tube 25 may include cross braces or rods 27 (shown in FIG. 17) to aid in movement from the linear force exerted on the wedged shaped spring tube 25 so the cut-covering assembly 62 will move outwardly without damage to the spring tube 25 as seen in FIG. 14 also in FIG. 12A and FIG. 13. When the linear movement of gate 29 is advanced toward the closed position between a first position and a second position, a side 291 of the valves gate contacts the contour tube(s) 425 of the right side cylinder 223 and urges a right side end of the right side cut-covering assembly 621 out of the right side cylindrical opening 223, i.e., so that the seal 26 and sloped tube 425 can be moved into the open end 36 of cut pipe 35 adjacent to the right side of the replacement new valve assembly 40. Simultaneously, a second side 242 the valve gate 29 (opposite the first side of the gate) contacts the sloped tube 425 of the left side of cylinder 226 and urges a left side end of the left side cut-covering assembly 622 out of the left side cylindrical opening 226 and into the open end of cut pipe 36 adjacent to the right side of the replacement new valve assembly 40. In this way, the two open ends of the replacement new valve assembly 40 can be placed into fluid communication and fluid-tight engagement with the cut ends of the pipeline 35.

FIG. 15 depicts a spring tube 25 as part of the cut-covering assembly 62. The spring tube 25 can be split and rolled larger in size to provide outward expansion that helps hold the seal 26 against the pipe walls of 21 and inside the pipe diameters 36.

FIG. 16 depicts an exterior surface 251 of the spring tube 25 that can travel and attach with the elastomer seal 26. An alternative order allows the interior surface 252 of the spring tube to travel and attach with the elastomer seal 26 as well, making the spring tube 25 ride directly against the internal diameter of pipe ends and making the elastomer seal 26 cover the spring tube 25.

In FIGS. 17 and 19, an embodiment is shown which uses at least one rod to move the cut-covering assembly 62. The cross braces 27 shown are provided at an angle to produce a wedging action by gate 29, with movement of the gate mechanically forcing the cross braces 27 during the closing movement of gate 29, moving cut-covering assemblies 26 into pipe ends 36. This illustration shows two cross braces 27 in spring tube 25.

FIG. 18 presents a sloped tube surface 425 with a structure that can meet with the shape of gate 29 as seen in FIG. 14. As gate 29 travels toward the closed position, the gate will contact a sloped tube surface 425, which can be in a wedge shape, in order to move the cut-covering seals 26 outward through pipe ends 21 to cover gaps 77 as they travel into pipe ends 36. The sloped tube surface 425 may be used as the wedged and pushing member without added cross braces 27 to move the cut-covering assembly 62. This sloped tube is shown to be spit 25 but may be selectively provided in solid form without a split spring shape and can be made from many optional materials such as PVC, HDPE, composite, hard rubbers metals or plastics. In this embodiment, the tube 255 of the cut-covering assembly 62 is a sloped tube 425 having a sloped surface 430 on an inner end adjacent the central chamber 227 (e.g., on the left side of the right side tube or conduit of the cut-covering assembly). If the gate 29 is moved vertically downwardly, as in the illustrated embodiments, the sloped surface 430 is inclined downwardly and outwardly from a proximal (upper) end 431 to a distal (lower) end 432. The sloped surface 430 between a proximal (upper) end 431 and distal (lower) end 432 should preferably form an angle of less than 90° with a hypothetical horizontal plane extending through the conduit, such as the angle Θ shown in the embodiment of FIG. 21.

FIGS. 19-21 depict an embodiment in which a sloped surface 430 is formed by cross braces 27 that include wedge shape attachments to provide tapered areas that cause a wedging or pushing effect to separate the two cut-covering assemblies 62 away from one another when gate 29 is forced between them as shown in FIGS. 12 and 12A. In some embodiments, a cut-covering assembly 62 can include both a first cross brace 271 and a second cross brace 272. The cross braces 27 can optionally include rods that extend inwardly toward the central chamber 227 in order to make better contact with the movable gate 29. In the illustrated embodiments, a bent rod attached across spring tube 25 is shown which can be incorporated with cross brace(s) 27. The bent rod is a medial flange 275 having an upper end 276 and lower end 277. FIG. 20 shows an alternative view of FIG. 19.

FIG. 21 depicts how downward movement from gate 29 shown as arrow A pushes wedge shaped rod(s) 27 or traveling cut-covering tapers 65 to transfer downward movement of a gate 29 to a sideways movement of the cut-covering assembly 62, shown as arrow B, by exerting force along the sloped surface 430 from the upper end 276 to the lower end 277. Pipe ends 21 making up the replacement new valve assembly 40 restrain the cut-covering assembly 62 forcing the energy to provide only sideways movement. This allows linear movement to be transferred to move the cut-covering assembly 62 to cover gap 77 and also move into pipe ends 36.

In FIG. 22, once the cut-covering assembly 62 has traveled into position to cover gap 77, the pressure within the enclosure 9 can be released, causing the cut-covering assembly 62 to seat tightly with the inner walls of pipe 35 and pipe assemblies 21. Once the enclosure 9 is depressurized, it can be removed from around the pipeline 35, and upon completion permanent external closure couplings 40A are installed to cover gap 77 to seal pipe ends 21 and existing pipe 35 to complete the valve insertion. Alternatively, closure couplings for steel pipeline 35 can be welded instead of using closure couplings 40A.

FIG. 23 is a perspective view of the pressurized enclosure housing 9 including service valve 10 with bonnet 32 attached to pressurized enclosure housing 9. Pressurized enclosure housing 9 is assembled around existing pipeline 35. Left side of existing pipeline 35 shown as 225 and sealed by left side split mechanical gland 11 (not shown) and right side of existing pipeline shown as 223 and is sealed by right side split mechanical gland 11. Lower pressurized enclosure housing 9A and upper pressurized enclosure housing 9B are assembled in fluid tight arrangement, stabilizing member 15 and jackscrew 17 not shown attached to bonnet 32.

FIG. 24 is a front view of the pressurized enclosure housing 9 is assembled around existing pipeline 35 including service valve 10 attached to upper enclosure housing 9 then bonnet 32 is attached to secured service valve 10. Mechanical glands 11 sealing enclosure housing 9 to existing pipeline 35 is shown. Lower pressurized enclosure housing 9A and upper pressurized enclosure housing 9B are assembled in fluid tight arrangement, stabilizing member 15 and jackscrew 17 not shown attached to bonnet 32.

FIG. 25 is a side sectional view of FIG. 25 of the pressurized enclosure housing 9 including service valve 10 and bonnet 32 assembled onto existing pipeline 35. Service valve and bonnet with cutting tool installed along line A-A of FIG. 25, stabilizing member 15 and jackscrew 17 not shown attached to bonnet 32.

FIG. 26 presents in more detail how pressure enclosure housing 9 assembles around pipeline 35. Both wedged rubbers 88 are wrapped around existing pipe 35 and shows both mechanical glands 11 bolted together around pipeline 35. Pressure enclosure housing 9 shown assembly is installed around a defective valve 20A found within pipe section 20 that needs removing. The pressurized housing 9 can provide a portion of its structure called a strong-back shown as 16 to remain if desired. The image shows a strong back 16 that is installed as part of pressurized housing 9.

FIG. 27 shows pressure enclosure housing 9 installed onto pipeline 35 including adjustable support bracket 19A supporting existing pipe section 20 preparing for cutting. Installed in the bottom half 9A of pressure enclosure housing 9, is adjustable support bracket 19A. Support is achieved by rotating 19B handles outside of the pressure enclosure housing 9 which works similar to rotating an acme thread through a nut combination to advance or retract adjustable support bracket 19A. one directional movement causes adjustable support bracket 19A apply pressure against cut section 20 and reversing the rotation retracts adjustable support bracket 19A below cut section 20 to provide room for a new valve assembly 40 to be installed as required. Adjustably actuated from outside pressure enclosure housing 9 it can achieve mechanical support pipe of 35 and appurtenances. Sealing fluid within pressure enclosure housing 9 can be performed by known flexible seals such as O-ring material.

FIG. 28 is a side view of wet tapping 31 cutting pipe section 20 to remove this section of pipe 20 from pipeline 35. wet tapping tool 31 is used to install new valve assembly 40 under pressure by use of the wet tapping machine tool 31. This figure shows tapping tool hole-saw staring to cut the crown of pipeline 35 with its cutter tool retaining member 30B included to capture existing valve 20A to be removed with the cut pipe section 20 seen in FIG. 29 with appurtenances that may be within the pipeline 35.

In FIG. 29, the hole-saw 33 shows cutting through the pipe and a tool retaining member 30B is shown to capture the existing valve with pipe section 20A to be removed with the cut section 20 of the pipeline 35. FIG. 29 shows the pipe section 20 removed within hole-saw 33 in detail and retracted above the service valve 10 and housed upper bonnet 32, wet tapping tool 31 with its housing can be removed at this time. The jackscrew adjustment of adjustable support bracket 19A is shown to be slightly lowered after cutting pipe section 20 to make room for the new valve assembly 40.

In FIG. 30 the wet tapping tool 31 has discarded and changed the cut pipe section 20 for a new valve assembly 40 and fulling installed the new valve assembly 40 by the wet tapping tool 31 movements have moved the new gates isolator to set cut-covering assemblies 62 into the existing pipe ends 36 to seal. The pressurized upper 9B and lower housing 9A shows to be selectively removed as desired. The strong back 16 is shown to remain either temporarily or permanently as desired.

FIG. 31 shows one embodiment of the restraining portion of the strong back 16 that can be left to hold the new valve assembly 40 assembly in place. This strong back 16 can be left until another means of restraint can be installed or selectively left permanently if desired.

FIG. 32 is a side view of an embodiment of the pressurized enclosure housing 9 shown to be assembled onto an existing pipeline. The adjustable support bracket 19A is shown attached to lower enclosure housing 9A.

FIG. 33 is perspective view of an embodiment of the pressurized enclosure housing 9 shown to be assembled onto an existing pipeline 35. The existing pipeline 35 is housed and exposed for cutting and removal.

FIG. 34 is front view of an embodiment of pressurized enclosure housing 9 shown to be assembled onto an existing pipeline 35. The adjustable support bracket 19A is shown attached to the to lower enclosure housing 9A. Bolts are presented to assemble the housing.

FIG. 35 is side view of one embodiment of a new valve assembly 40 installed into pipeline 35 depicting one means of temporary installing O.D. Outside Diameter centering collars 28 to new valve ends 21 by bolting 4 a restraining clamp 2 and allowing one side of centering collars 28 to overhang with its inside diameter matching the outside diameter of the existing pipe 35.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Definitions

As used herein, the following terms and variations thereof have the meanings given below, unless a different meaning is clearly intended by the context in which such term is used.

"About" and "approximately" refer to a quantity which is within 10% of a stated quantity, preferably within 5% of the stated quantity.

"Brace" refers to a structural component attached to a structure in order to strengthen and/or support the structure.

"Clamp" refers to a component which exerts pressure on the outer surface of a pipe in the present system. Clamps used in the present system and method exert sufficient binding force to restrain the tension wires in PCCP pipe with sufficient force to prevent the tension wires from losing tension.

"Gate valve" refers to a control valve that either allows a fluid to flow through the valve unobstructed or stops the fluid flow. A gate valve opens by retracting a barrier (gate) out of the path of the fluid. Gate valve faces can be parallel but are commonly sloped, i.e., wedge-shaped.

"Horizontal," refers to a plane or direction which is approximately perpendicular to a surface on which the present valve assembly is placed.

"Vertical" refers to a plane or direction which is perpendicular to a horizontal plane or direction.

"Prestressed Concrete Cylinder Pipe" (PCCP) refers to a pipe formed from a concrete core, a thin steel cylinder, high tensile prestressing wires and a mortar coating. The concrete core is the main structural load-bearing component, with the steel cylinder acting as a water barrier between the concrete layers. The prestressing wires produce a uniform compressive pressure in the core that offset tensile stresses in the pipe, and the mortar coating protects the prestressing wires from physical damage and external corrosion.

"Housing" refers to an enclosure.

A "split tube" refers to a conduit having a cut along its length, such as a split metal cylinder, preferably formed from an elastic material. A split tube can be rolled in on itself, so that one cut side is rolled inside the other (i.e., so that the outer surface of one cut side faces the inner surface of the other cut side) to provide spring-type expansion of the split tube.

"Tube" refers to a generally tubular pipe or conduit.

The terms "above," "below," "between," "upward," "downward," "right," "left," and other terms of relative position or orientation as used herein refer to a relative position or orientation of one component of the valve assembly in relation to another, or to a relative position or orientation of the valve assembly in relation to a pipeline or support surface.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

What is claimed is:

1. A replacement valve assembly for a pipe, comprising:
(1) a valve body having a right side and a left side, the valve body comprising a right side cylinder, a left side cylinder, and a central chamber between the right side cylinder and the left side cylinder, wherein the central chamber, the right side cylinder, and the left side cylinder are disposed along a longitudinal axis and are in fluid communication so as to form a fluid passage between a right side cylindrical opening of the right side cylinder and a left side cylindrical opening of the left side cylinder, and wherein the central chamber comprises a movable valve;
(2) a right side cut-covering assembly in an interior of the right side cylinder, comprising:
a right side tube having an exterior surface, an interior surface, a right side, and a left side;
a right side elastomeric seal having an exterior surface and an interior surface, wherein the exterior surface of the right side elastomeric seal contacts an interior surface of the right side cylinder and the interior surface of the right side elastomeric seal contacts the exterior surface of the right side tube; and
a right side sloped surface formed in or mechanically connected to the left side of the right side tube, the sloped surface having an angle of less than 90° and extending into the central chamber; and
(3) a left side cut-covering assembly in an interior of the left side cylinder, comprising:
a left side tube having an exterior surface, an interior surface, a right side, and a left side;
a left side elastomeric seal having an exterior surface and an interior surface, wherein the exterior surface of the left side elastomeric seal contacts an interior surface of the left side cylinder and the interior surface of the left side elastomeric seal contacts the exterior surface of the left side tube; and
a left side sloped surface formed in or mechanically connected to the right side of the left side tube, the sloped surface having an angle of less than 90° and extending into the central chamber,
wherein when the valve is moved between a first position and a second position, a right side of the valve contacts the sloped surface of the right side tube and urges a right side end of the right side cut-covering assembly out of the right side cylindrical opening, and simultaneously a left side of the valve contacts the sloped surface of the left side tube and urges a left side end of the left side cut-covering assembly out of the left side cylindrical opening, thereby placing the valve assembly into fluid-tight engagement with cut ends of the pipe.

2. The valve assembly of claim 1, wherein the right side sloped surface is formed in the left side of the right side tube and the left side sloped surface is formed in the right side of the left side tube.

3. The valve assembly of claim 1, wherein:

at least a first cross brace extends between a first position on the interior surface of the right side tube and a second position on the interior surface of the right side tube, and the right side sloped surface comprises a flange extending from the first cross brace inwardly toward the central chamber; and at least a second cross brace extends between a first position on the interior surface of the left side tube and a second position on the interior surface of the left side tube, and the left side sloped surface comprises a flange extending from the second cross brace inwardly toward the central chamber.

4. The valve assembly of claim 3, wherein the flange of each of the first and second cross braces is a bent or curved bar.

5. The valve assembly of claim 1, wherein:

a third cross brace extends between the interior surface of the right side tube and comprises a flange having a sloped surface which extends from the third cross brace inwardly toward the central chamber; and a fourth cross brace extends between the interior surface of the left side tube and comprises a flange having a sloped surface which extends from the fourth cross brace inwardly toward the central chamber.

6. The valve assembly of claim 1, wherein the right side tube and the left side tube are spring tubes.

7. The valve assembly of claim 1, further comprising centering collars for aligning the valve assembly with pipe ends.

8. The valve assembly of claim 1, wherein the moveable valve is a gate valve.

9. A method for replacing a valve in a pipe, comprising:

placing a housing in fluid-tight engagement with the pipe on a right side and a left side of the valve;

cutting the pipe on a right side and a left side of the valve, thereby creating a right side opening and a left side opening in the pipe;

removing the valve through the housing;

advancing a replacement valve assembly into the housing, wherein a cut-covering assembly is disposed within each pipe end of the replacement valve assembly, each cut-covering assembly comprising a cylindrical, elastomeric seal, a tube within the seal, and a sloped surface formed in or mechanically connected to the tube, the sloped surface having an angle of less than 90° and extending inwardly toward a central portion of the valve assembly, the valve assembly further comprising a linear moving valve for placement between the cut-covering assemblies;

placing the pipe ends of the valve assembly into alignment with the right side opening and the left side opening of the pipe; and moving the valve from a first position to a second position, wherein a right side of the valve thereby contacts the sloped surface of a right side cut-covering assembly and urges a right side end of the right side cut-covering assembly into the right side opening of the pipe, and simultaneously a left side of the valve contacts the sloped surface of the left side cut-covering assembly and urges a left side end of the left side cut-covering assembly into the left side opening of the pipe, thereby placing the valve assembly into fluid-tight engagement with the cut ends of the pipe.

10. The method of claim 9, wherein the sloped surface of the right side cut-covering assembly is formed in the left side of the tube of the right side cut-covering assembly, and the left side sloped surface is formed in the right side of the tube of the left side cut-covering assembly.

11. The method of claim 9, wherein a first cross brace extends between an interior of the tube of the right side cut-covering assembly, and the right side sloped surface comprises a flange extending from the first cross brace, and wherein a second cross brace extends between an interior of the tube of the left side cut-covering assembly, and the left side sloped surface comprises a flange extending from the second cross brace.

12. The method of claim 9, wherein the pipe is a prestressed concrete cylinder pipe (PCCP) having a concrete outer layer, an interior metal cylinder, and a wire wound around the metal cylinder.

13. The method of claim 9, wherein the tubes of the cut-covering assemblies are spring tubes.

14. The method of claim 9, further comprising the step of adding centering collars matching the pipe's outside diameter on top of each of the right side opening and the left side opening of the pipe.

\* \* \* \* \*